(12) United States Patent
Vemulapalli et al.

(10) Patent No.: US 10,609,008 B2
(45) Date of Patent: Mar. 31, 2020

(54) SECURING AN ELECTRONICALLY TRANSMITTED COMMUNICATION

(71) Applicant: NXP USA, Inc., Austin, TX (US)

(72) Inventors: Jyothi Vemulapalli, Secunderabad (IN); Rampullaiah Batchu, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 302 days.

(21) Appl. No.: 15/617,168

(22) Filed: Jun. 8, 2017

(65) Prior Publication Data

US 2018/0359231 A1    Dec. 13, 2018

(51) Int. Cl.
*H04L 29/06* (2006.01)
*H04L 9/08* (2006.01)

(52) U.S. Cl.
CPC .......... *H04L 63/061* (2013.01); *H04L 9/0844* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 6,253,321 B1 | 6/2001 | Nikander et al. | |
| 6,636,520 B1 | 10/2003 | Jason et al. | |
| 7,046,647 B2 | 5/2006 | Oba et al. | |
| 7,574,603 B2* | 8/2009 | Swander | H04L 63/061 713/166 |
| 8,805,977 B2 | 8/2014 | Vemulapalli et al. | |
| 2004/0136533 A1* | 7/2004 | Takagaki | H04L 9/0891 380/255 |
| 2005/0076216 A1* | 4/2005 | Nyberg | H04L 9/0844 713/171 |
| 2007/0180227 A1* | 8/2007 | Akimoto | H04L 63/0464 713/153 |
| 2008/0016334 A1 | 1/2008 | Kurapati et al. | |
| 2013/0061034 A1* | 3/2013 | Walheim, Sr. | H04L 63/0272 713/150 |
| 2014/0108781 A1* | 4/2014 | Zhang | H04L 63/061 713/151 |
| 2016/0134607 A1* | 5/2016 | Liu | H04L 63/08 726/6 |
| 2016/0182463 A1* | 6/2016 | Suram | H04L 63/061 713/153 |

FOREIGN PATENT DOCUMENTS

| | | |
|---|---|---|
| CN | 1741523 A | 3/2006 |
| EP | 2159988 A1 | 3/2010 |
| EP | 2823620 B1 | 3/2013 |
| WO | 2006/068450 A1 | 6/2006 |

OTHER PUBLICATIONS

RFC 4306—Internet Key Exchange (IKEv2) Protocol, Dec. 2005, pp. 1-99.
Internet Key Exchange Protocol Version 2 (IKEv2), Internet Engineering Task Force (IETF), Request for Comments: 7296; Oct. 2014, pp. 1-142.

* cited by examiner

*Primary Examiner* — Shin-Hon (Eric) Chen

(57) ABSTRACT

A secure communication between computer systems over a network, such as the Internet, is performed utilizing an enhancement to the IKEv2 key exchange protocol that provides more security by exchanging the IKE_SA_INIT messages in a secure and protected manner. Cryptographic suites are utilized to encrypt and authenticate the IKE_SA_INIT exchange messages in order to prevent cyberattacks against such a messaging protocol.

20 Claims, 11 Drawing Sheets

SECURING AN ELECTRONICALLY TRANSMITTED COMMUNICATION

TECHNICAL FIELD

The present invention relates in general to securing a communication between participants of an electronically transmitted communication over a network, and more particularly, to encrypting messages transmitted between participants communicating over a network.

BACKGROUND

In network communications, especially communications over a wide area network ("WAN") such as the Internet, it is often important to secure the communicated messages. As there are many possibilities for intercepting, eavesdropping, or tampering by third parties, many such communicated messages should be secured.

A known approach for securing communication is the internet protocol security ("IPsec"), which is a suite of related protocols for cryptographically securing communications at the IP Packet Layer. The IPsec provides confidentiality, data integrity, access control, and data source authentication of IP datagrams being sent over various communication channels. These services are provided by maintaining shared secrets between the source and the sink of an IP datagram. IPsec includes protocols for establishing mutual authentication between participants at the beginning of the session, and negotiation of cryptographic keys to be used during the session.

The Internet Key Exchange ("IKE") protocol is a component of IPsec used for performing mutual authentication and establishing and maintaining IPsec security associations ("SAs"). A SA is a unidirectional agreement between participants regarding the methods and parameters to use in securing a communication channel (e.g., establishing a virtual private network ("VPN")). A SA is a bundle of algorithms and parameters (such as keys) that are being used to encrypt and authenticate a particular communication flow in one direction. Full bidirectional communication requires at least two SAs, one for each direction. An IPsec tunnel includes a pair of unidirectional SAs—one SA for each direction of the tunnel—that specify the security parameter index ("SPI"), destination IP address, and security protocol (Authentication Header ("AH") or Encapsulating Security Payload ("ESP")) employed. Further information on IPsec and the attributes for SA and IKE negotiations can be found in RFC 4306, which is a published document hereby incorporated by reference herein.

The Internet Key Exchange Version 2 ("IKEv2") protocol dynamically establishes and maintains a shared state (for a secure communication channel) between the end-points of an IP datagram. IKEv2 negotiates the IKEv2 Security Association ("IKE-SA") for establishing a secure communication channel over a network between participants. The IKE_SA uses shared secret information that it stores to do two different functions (1) establish CHILD_SAs for ESP Protocol and/or AH Protocol, and (2) defines the cryptographic algorithms to be used by the SAs. The IKEv2 protocol is described in detail in RFC 7296—Internet Key Exchange Protocol Version 2 (IKEv2), published October 2014, which is hereby incorporated by reference herein (hereinafter referred to as "RFC 7296").

Referring to FIG. 1, in order to negotiate and establish an IKE_SA, a basic IKEv2 exchange in accordance with the prior art is performed between the participants, often identified as the Initiator 101 and the Responder 102. The basic IKEv2 protocol is a request/response pair protocol that contains four messages (or two exchanges). The first exchange contains an IKE_SA_INIT request message from the initiator 101 to the Responder 102, and an IKE_SA_INIT response message from the Responder 102 to the initiator 101. These messages are "plain," meaning that they are non-encrypted and non-authenticated messages. This first exchange (first pair) of messages negotiates cryptographic algorithms, exchange notices, and does a Diffie-Hellman exchange between the two participants desiring to establish an IKE SA.

Within this disclosure, a "Plain IKE_SA_INIT Request Message" is defined as a non-encrypted and non-authenticated IKE_SA_INIT request message, such as disclosed in the previously referenced RFC 7296. Within this disclosure, a "Plain IKE_SA_INIT Response Message" is defined as a non-encrypted and non-authenticated IKE_SA_INIT response message, such as disclosed in the previously referenced RFC 7296.

The second exchange (second pair) of messages contains an IKE_SA_AUTH request message from the Initiator 101 to the Responder 102, and an IKE_SA_AUTH response message from the Responder 102 to the Initiator 101. This second pair of messages exchanges identities and certificates, and establishes further communication. Parts of these second pair of messages are protected with keys established through the first pair of messages. At the end of the IKE_AUTH exchanges, the participants (e.g., the Initiator 101 and the Responder 102) have successfully established a secure communication channel over a network (e.g., a VPN).

A problem with the foregoing is that the prior art IKE_SA_INIT exchange uses the previously noted Plain messages (i.e., the non-encrypted and non-authenticated Plain IKE_SA_INIT Request Message and Plain IKE_SA_INIT Response Message). These Plain messages can lead to one or more types of attacks from third parties, such as man-in-the-middle, denial-of-service ("DoS"), and spoofing attacks.

DETAILED DESCRIPTION

Aspects of the present invention are configured to inhibit third party attacks (e.g., man-in-the-middle, DoS, and spoofing attacks) against IKE_SA_INIT exchanges between communicating devices over a network. Embodiments of the present invention provide for a highly secured enhanced IKEv2 protocol, which is an enhancement to the currently implemented IKEv2 protocol (see FIG. 1) by exchanging in a protected manner the IKE_SA initiating (IKE_SA_INIT) messages (i.e., the IKE_SA_INIT request and response messages). Aspects of the present invention define parameters for such a highly secured IKEv2 protocol, which may include a cryptographic suite used to protect the IKE_SA_INIT messages. Additionally, aspects of the present invention reduce the number of IKE messages, since no additional IKE_SA_INIT messages (for anti-spoofing or mismatched Diffie-Hellman groups) are required for the protocol. Moreover, aspects of the present invention reduce the number of possible errors, decrease the latency of the Internet Key Exchange, and increase robustness by using the first pair of IKE_SA_INIT messages in a secure manner.

Aspects of the present invention do not require the utilization of a perfect forward secrecy feature, which can internally reduce connection rate performance between devices over a network. Furthermore, aspects of the present invention avoid the implementation of a cookie mechanism and vulnerabilities of DoS attacks, since both of the participants in the exchange are trusted. Additionally, aspects of the present invention reduce man-in-the-middle attacks, since the first exchange (IKE_SA initiating (IKE_SA_INIT) messages) is secured/encrypted.

The IKEv2 protocol is widely used across enterprise/carrier-grade segments. It is used along with the IPsec protocol to provide security and perform authentication. As a result, embodiments of the present invention may be utilized in all sorts of various network configurations that typically employ the IKEv2 protocol, such as in corporate security gateways, enterprise gateways, home security gateways, mobile security applications, remote access applications, and mobile networks using MOBIKE, among others.

Figure 2:
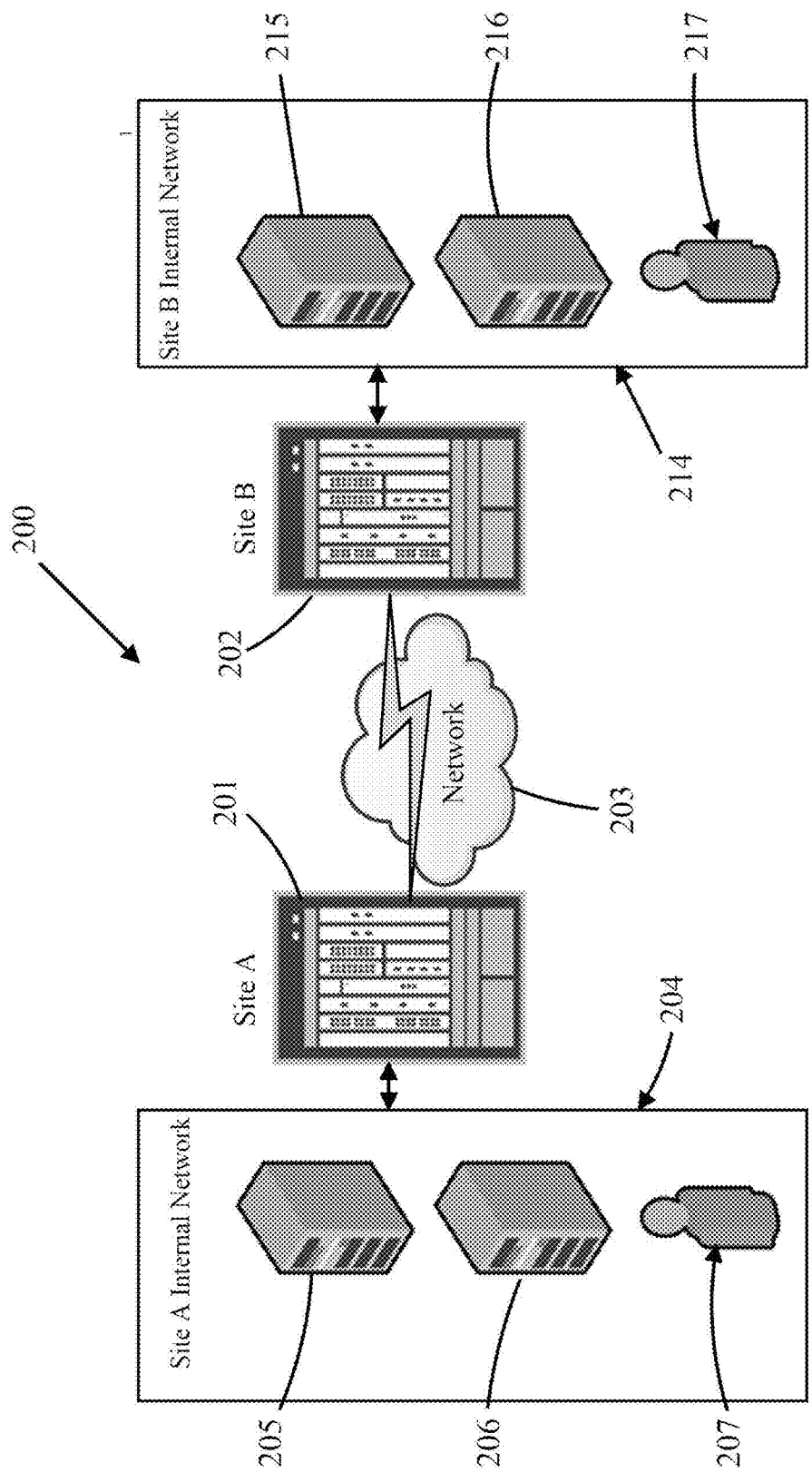
FIG. 2 illustrates an example of a network configuration that can implement embodiments of the present invention.

FIG. 2 illustrates an example of a network deployment 200 in which embodiments of the present invention may be utilized. Site A may include an internal network 204 (e.g., a local area network ("LAN")) coupled to a gateway server 201. The internal network 204 of Site A may include one or more computer system(s) 205 . . . 206 hard wired to the internal network 204, and/or one or more computer system(s) 207 communicating in a wireless manner to the internal network 204. Likewise, Site B may include an internal network 214 (e.g., a LAN) coupled to a gateway server 202. The internal network 214 of Site B may include one or more computer system(s) 215 . . . 216 hard wired to the internal network 214, and/or one or more computer system(s) 217 communicating in a wireless manner to the internal network 214. The gateway server 201 is implemented for coupling the internal network 201 of Site A to a network 203 (e.g., a WAN), which may include a public switched telephone network ("PSTN"), which may include the Internet. The gateway server 202 (or any other suitable device for performing such a function) may be implemented for coupling the internal network 214 of Site B to the network 203.

Embodiments of the present invention may be utilized to provide for a secure communication between any one of the computer systems 205 . . . 207 and any one of the computer systems 215 . . . 217. As a result, in accordance with embodiments of the present invention, the gateway servers 201 and 202 will attempt to communicate in a secure manner over the network 203. The result may be an establishment of an IKE_SA (e.g., with a VPN connection) over the network 203. In this disclosure, participants desiring to establish an IKE_SA in such a network deployment 200 will be referred to as operating in a Site-to-Site Mode. Embodiments of the present invention may be implemented within the gateway server 201 and the gateway server 202.

Figure 3:
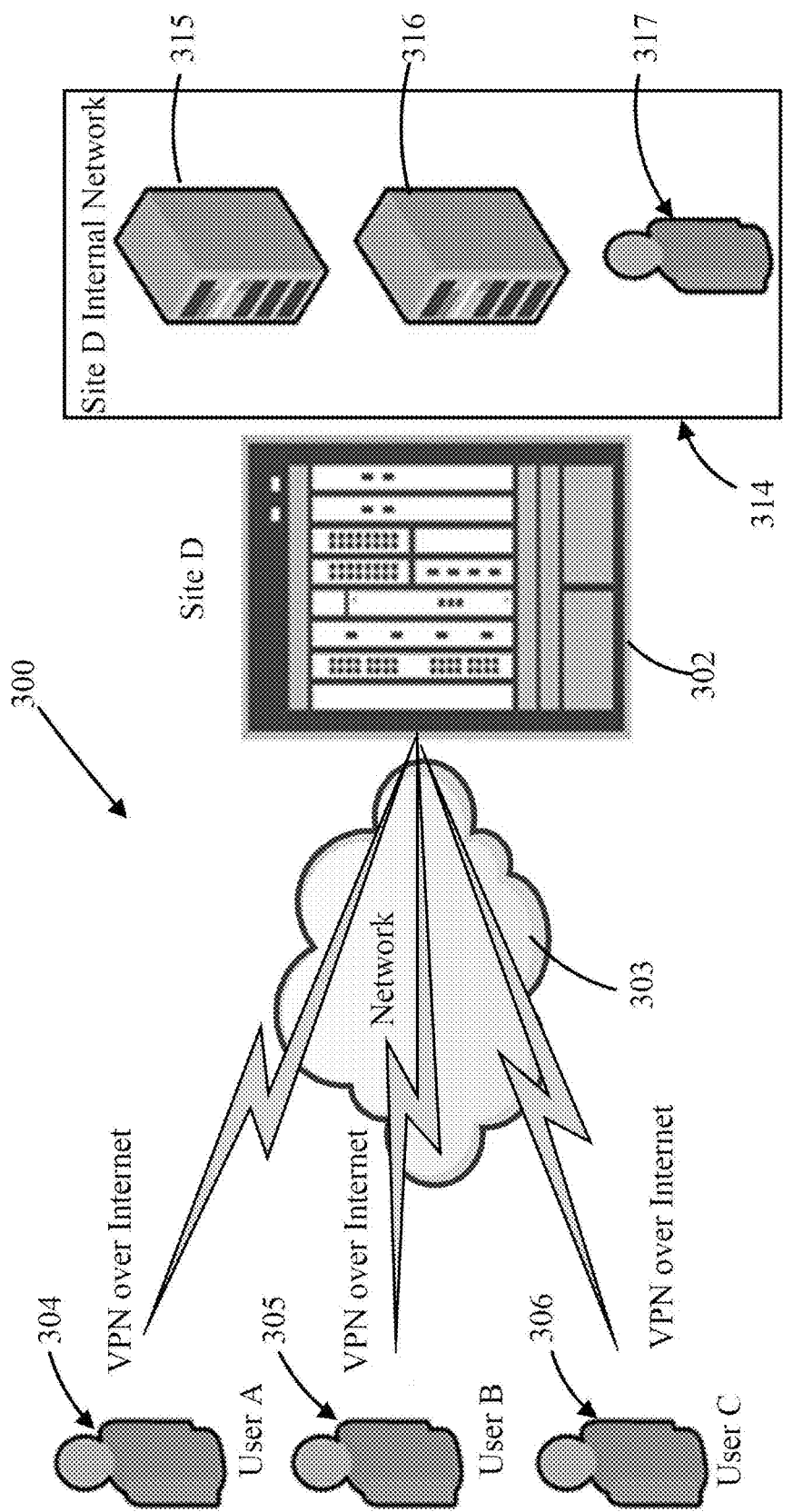
FIG. 3 illustrates an example of a network configuration that can implement embodiments of the present invention.

FIG. 3 illustrates another example of a network deployment 300 that may utilize embodiments of the present invention for establishing secure communications between participants over a network. The internal network 314 (e.g., a LAN) of a Site D may include one or more computer system(s) 315 . . . 316 hardwired to the internal network 314, and/or one or more computer system(s) 317 communicating in a wireless manner to the internal network 314. The internal network 314 may be coupled to a gateway server 302 (or any other suitable device for performing such a function) to provide communication access between the computer systems 315 . . . 317 in the internal network 314 and a network 303 (e.g., a WAN), which may include a PSTN, which may include the Internet. In this exemplary network deployment 300, one or more computer systems 304 . . . 306 may be operating in a remote fashion (e.g., a mobile computer system) and desire to establish a secure communication with one of the computer system(s) 315 . . . 317. Any one or more of the computer system(s) 304 . . . 306 may be coupled to the network 303 using any well-known means, such as through the utilization of a network router (not shown), which provides a wired or wireless access to the network 303 for any one or more of the computer system(s) 304 . . . 306, or any other suitable "dial-up" technology. Such a network router may be located in a private residence or in a public location (e.g., a public library, school, commercial enterprise).

As will be described herein, an enhanced IKEv2 protocol configured in accordance with embodiments of the present invention establishes an IKE_SA (e.g., with a VPN connection) over the network 303 between the one or more computer system(s) 304 . . . 306 and one of the computer system(s) 315 . . . 317 within the internal network 314. In this disclosure, participants desiring to establish an IKE_SA in such a network deployment 300 will be referred to as operating in a Server Mode. Embodiments of the present invention may be implemented within any one of the computer system(s) 304 . . . 306 and the gateway server 302.

It should be noted that embodiments of the present invention may be configured so that a gateway server (e.g., gateway servers 201, 202, 302) may operate to establish a secure communication with another gateway server over a network, such as illustrated with respect to the network deployment 200 of FIG. 2, and also operate to establish a secure communication over a network with a remote computer system, such as within the network deployment 300 illustrated in FIG. 3. In other words, the two network deployments 200, 300 are not mutually exclusive. For example, either one of the gateways servers 201, 202 may also be configured to establish secure communications with remote computer systems, such as the remote computer system(s) 304 . . . 306.

Figure 4:
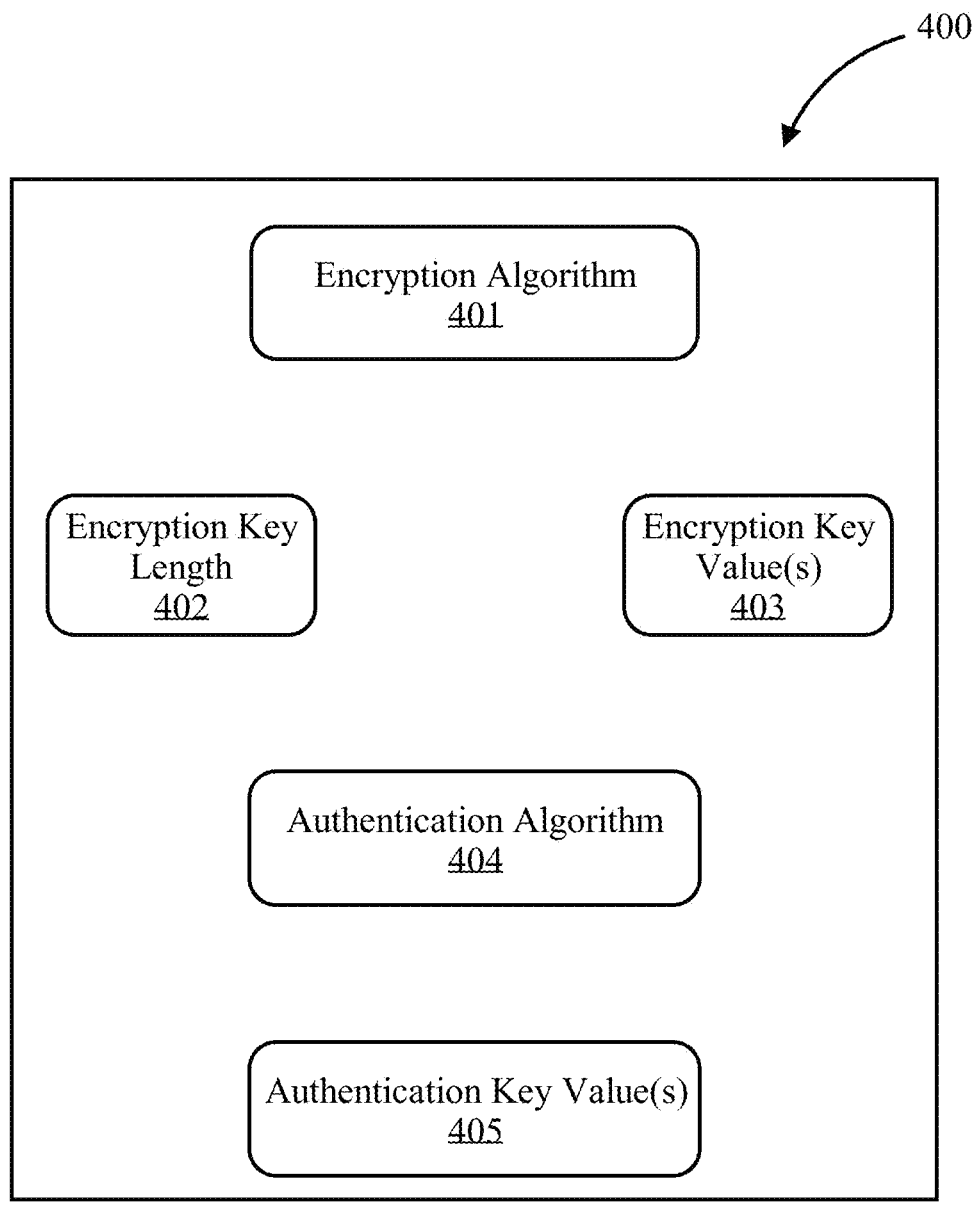
FIG. 4 illustrates a cryptographic suite configured in accordance with embodiments of the present invention.
Figure 6:
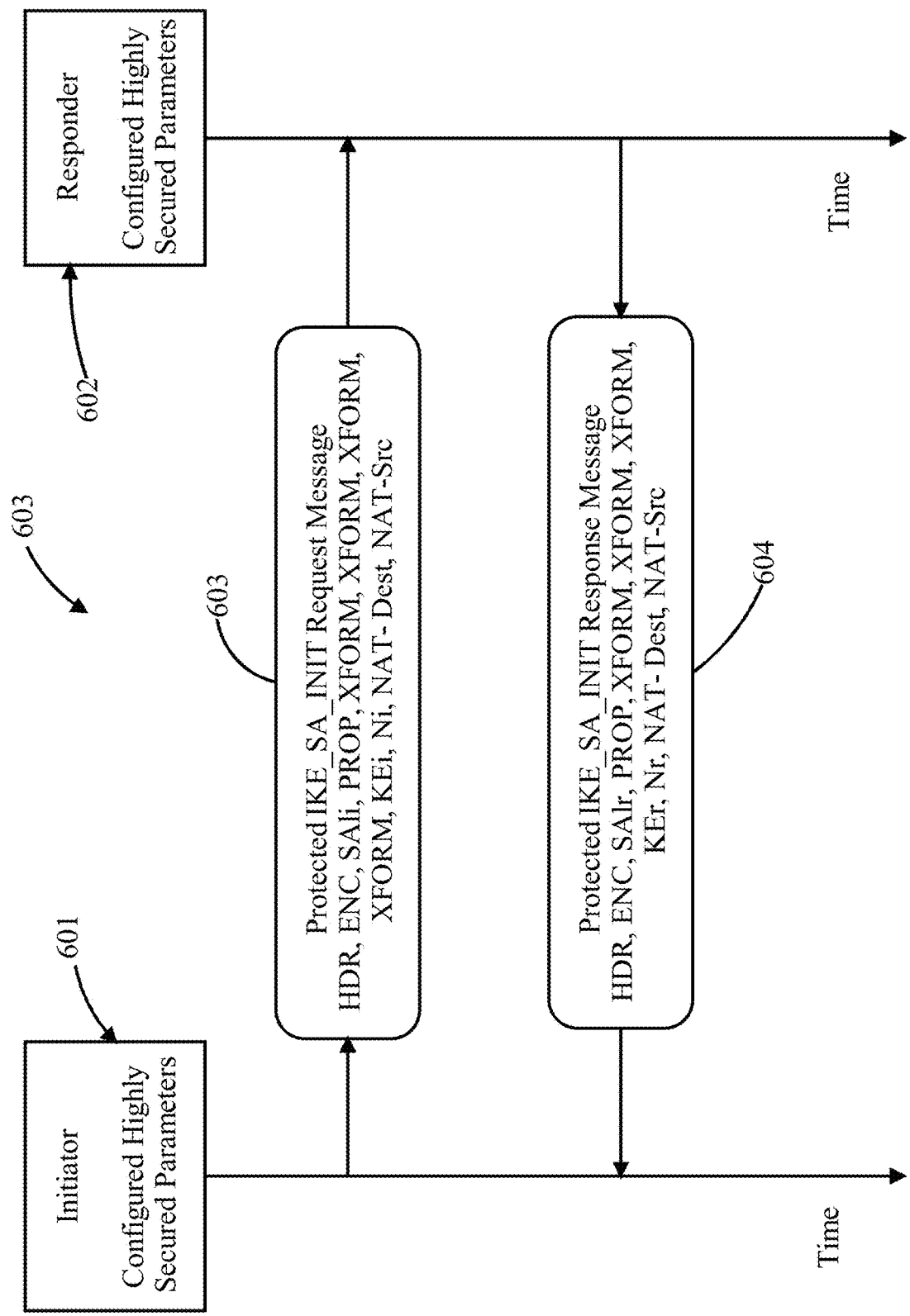
FIG. 6 illustrates an IKE_SA_INIT exchange configured in accordance with embodiments of the present invention.

As will be further described herein with respect to FIG. 6, embodiments of the present invention incorporate an encrypted payload into the IKE_SA_INIT exchange between the participants wishing to communicate over a network (e.g., networks 203, 303). Referring to FIG. 4, such encrypted payloads are established by the participants wishing to communicate utilizing a selection of highly secured IKEv2 parameters ("HSIP") 400 for the protection (encryption and authentication) of the two messages in the IKE_SA_INIT exchange. Each HSIP 400 contains a cryptographic suite containing cipher parameters and integrity parameters. The cipher parameters may include an encryption/decryption algorithm 401, an encryption key length 402, and one or more encryption key value(s) 403. The encryption/decryption algorithm 401 may be designed to be symmetric. The integrity parameters for each HSIP 400 may include an authentication algorithm 404 and one or more authentication key value(s) 405. Each HSIP 400 may include additional variables to support other cipher/integrity algorithms. Moreover, each HSIP 400 can be enhanced to support combined mode algorithms, which provide for confidentiality and integrity. Some non-limiting examples of combined mode algorithms include AES-CCM and AES-GCM authenticated encryption, which are disclosed in RFC 5084, published November 2007, which is hereby incorporated by reference herein. The enhanced IKEv2 protocol configured in accordance with embodiments of the present invention utilizes a selected HSIP record 400 to protect (encrypt and authenticate) a Plain IKE_SA_INIT Request Message, thus creating a Protected IKE_SA_INIT Request Message (further discussed herein with respect to FIG. 6).

The enhanced IKEv2 protocol configured in accordance with embodiments of the present invention utilizes a selected HSIP record 400 to protect (encrypt and authenticate) a Plain IKE_SA_INIT Response Message, thus creating a Protected IKE_SA_INIT Response Message (further discussed herein with respect to FIG. 6).

Figure 5:
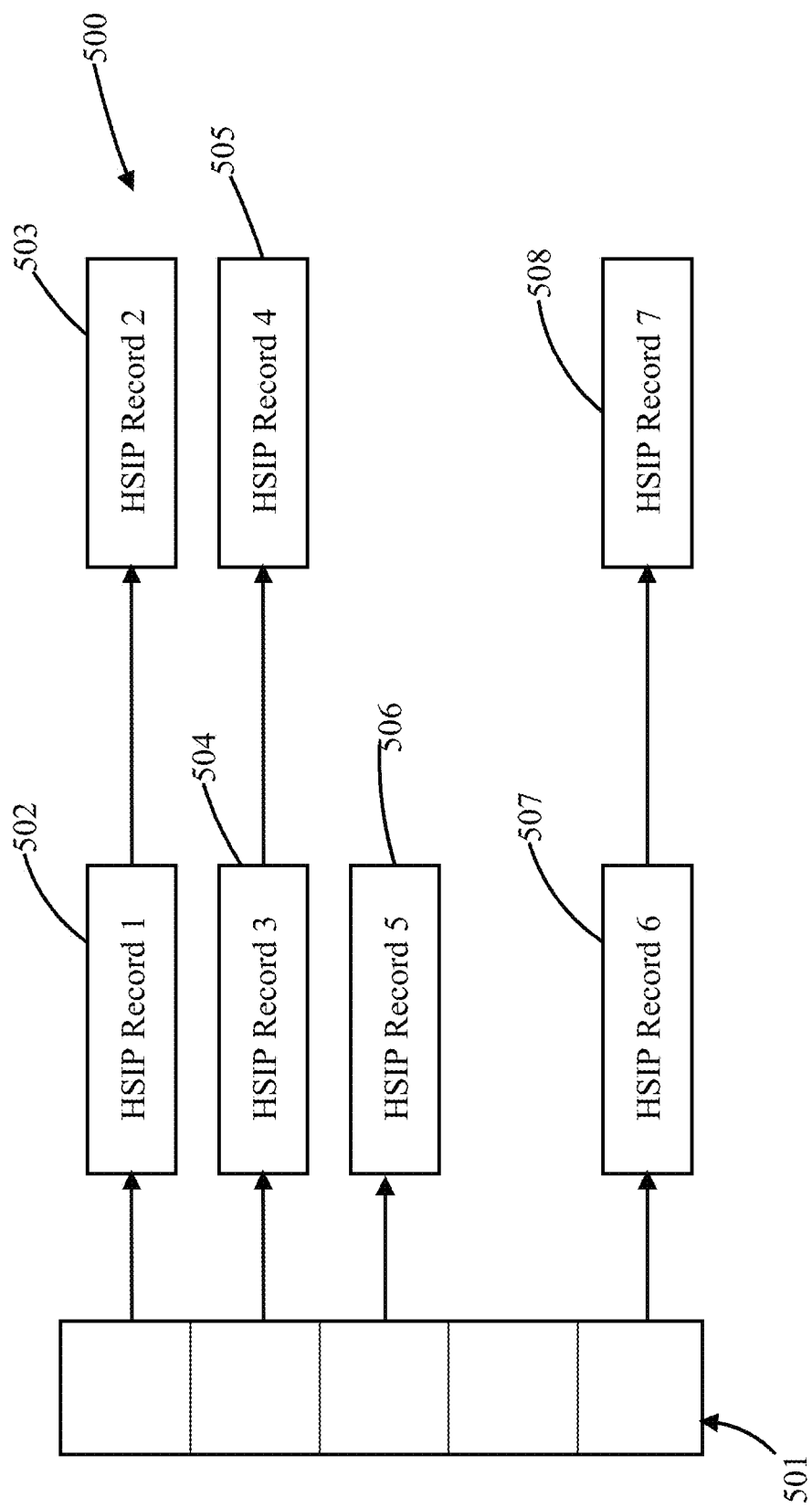
FIG. 5 illustrates a diagram of a highly secured IKEv2 parameters database configured in accordance with embodiments of the present invention.

Within embodiments of the present invention, a computer system wishing to implement the enhanced IKEv2 protocol configured in accordance with embodiments of the present invention may have access to one or more available HSIP records 400, which may be stored within an HSIP configuration database ("HSIPDB"). A HSIPDB may be implemented with any standard data structures such as linked lists, a hash table, arrays, etc. FIG. 5 illustrates a non-limiting example of such an HSIPDB 501, which may contain one or more HSIP records 400 (each of which are identified in the exemplary HSIPDB 501 as the HSIP records 502 . . . 508) selectable by the enhanced IKEv2 protocol of embodiments of the present invention through the use of a hash table where a hash index 501 is utilized by a computer system for selection of an HSIP record 502 . . . 508 by the computer system. In a non-limiting example, each hash index within the hash table 501 may include a linked list of one or more HSIP records 400.

Each HSIP record 502 . . . 508 may be uniquely identified with an IP address pertaining to a device (e.g., a gateway server) to which the computer system may desire to establish a secure communication over a network. As a result, each HSIP record 502 . . . 508 may be configured with parameters 401-405 that were specifically pre-selected to be associated for communicating with a computer system having a specific IP address. For example, referring to exemplary network deployment 200 of FIG. 2 along with the exemplary HSIPDB 501 of FIG. 5, each of the gateway servers 201, 202 may have stored therein a HSIPDB 501. In such an example, one of the HSIP records 502 . . . 508 in the HSIPDB 501 stored within the gateway server 201 will be predetermined to be utilized by embodiments of the present invention to protect (encrypt and authenticate) an IKE_SA_INIT message to be transmitted to the gateway server 202. Therefore, such a predetermined HSIP record (e.g. any one of the HSIP records 502 . . . 508) will include the IP address of the gateway server 202. Other ones of the HSIP records 502, 508 may be pre-programmed to include IP addresses of other gateway servers (not shown), which may be coupled to the network 203. As will be further disclosed with respect to FIGS. 7-10, embodiments of the present invention may search for a specific HSIP record within the HSIPDB as a function of the IP address of a destination participant to which an IKE_SA_INIT message is to be sent.

Likewise, HSIP records 400 stored within the computer systems 304 . . . 306 (see FIG. 3) may each be programmed for use in protecting IKE_SA_INIT messages intended for delivery to different gateway servers coupled to the network 303, such as the gateway server 302.

Consequently, within embodiments of the present invention, the HSIP records 400 have been stored within pairs of network devices that may desire to securely communicate with each other in the future. A reason for this arrangement is because the HSIP records 400 may employ symmetric encryption/authentication algorithms.

Within embodiments of the present invention, the following types of HSIP databases ("HSIPDBs") may be utilized:
a transmit highly secured IKEv2 parameters database ("Tx HSIPDB");
a receive highly secured IKEv2 parameters database ("Rx HSIPDB");
a Server Mode transmit HSIP ("Tx HSIP") record;
a Server Mode receive HSIP ("Rx HSIP") record.

Figure 7:
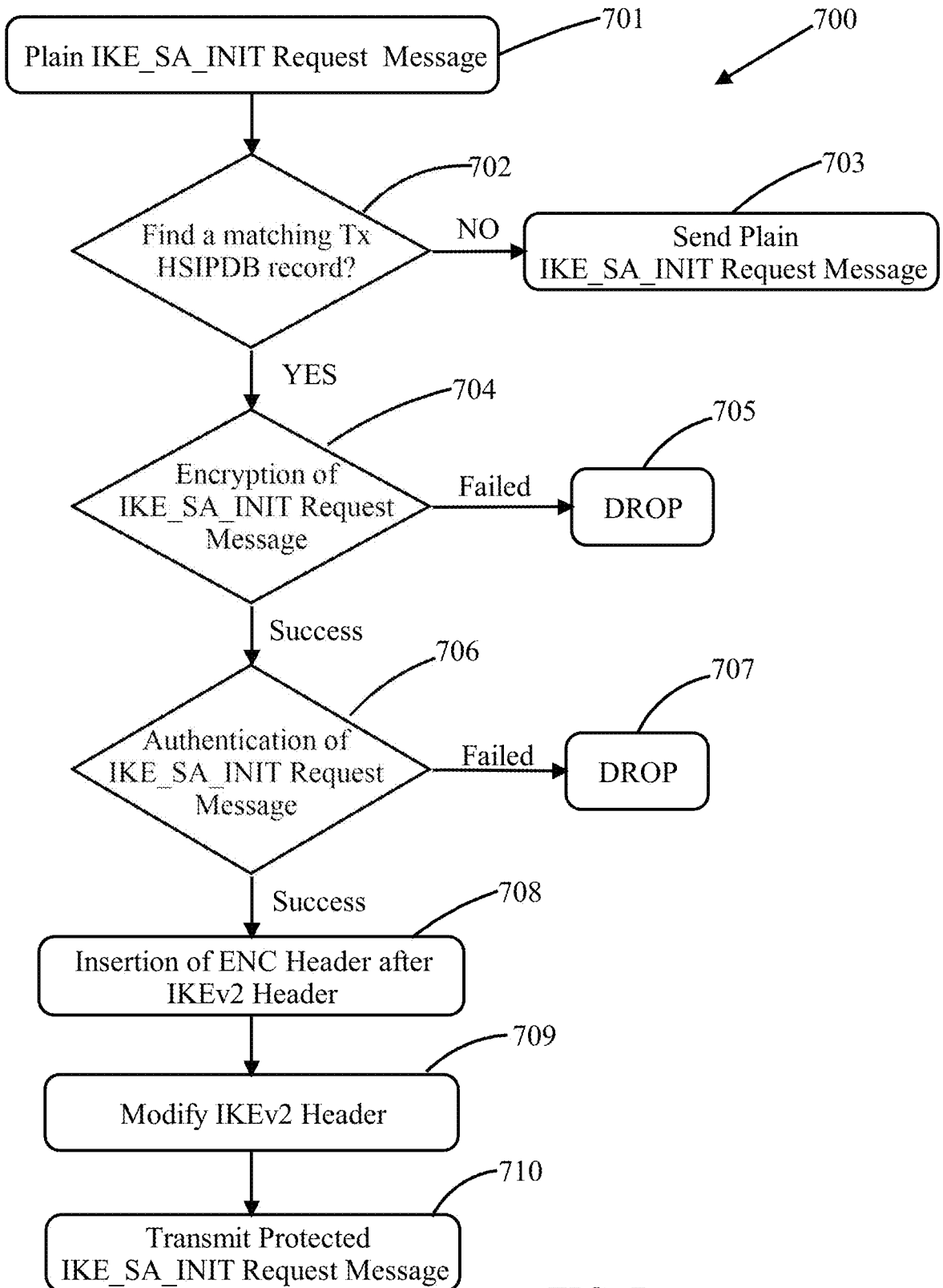
FIG. 7 illustrates a system and method for framing a Protected IKE_SA_INIT Request Message in accordance with embodiments of the present invention.
Figure 9:
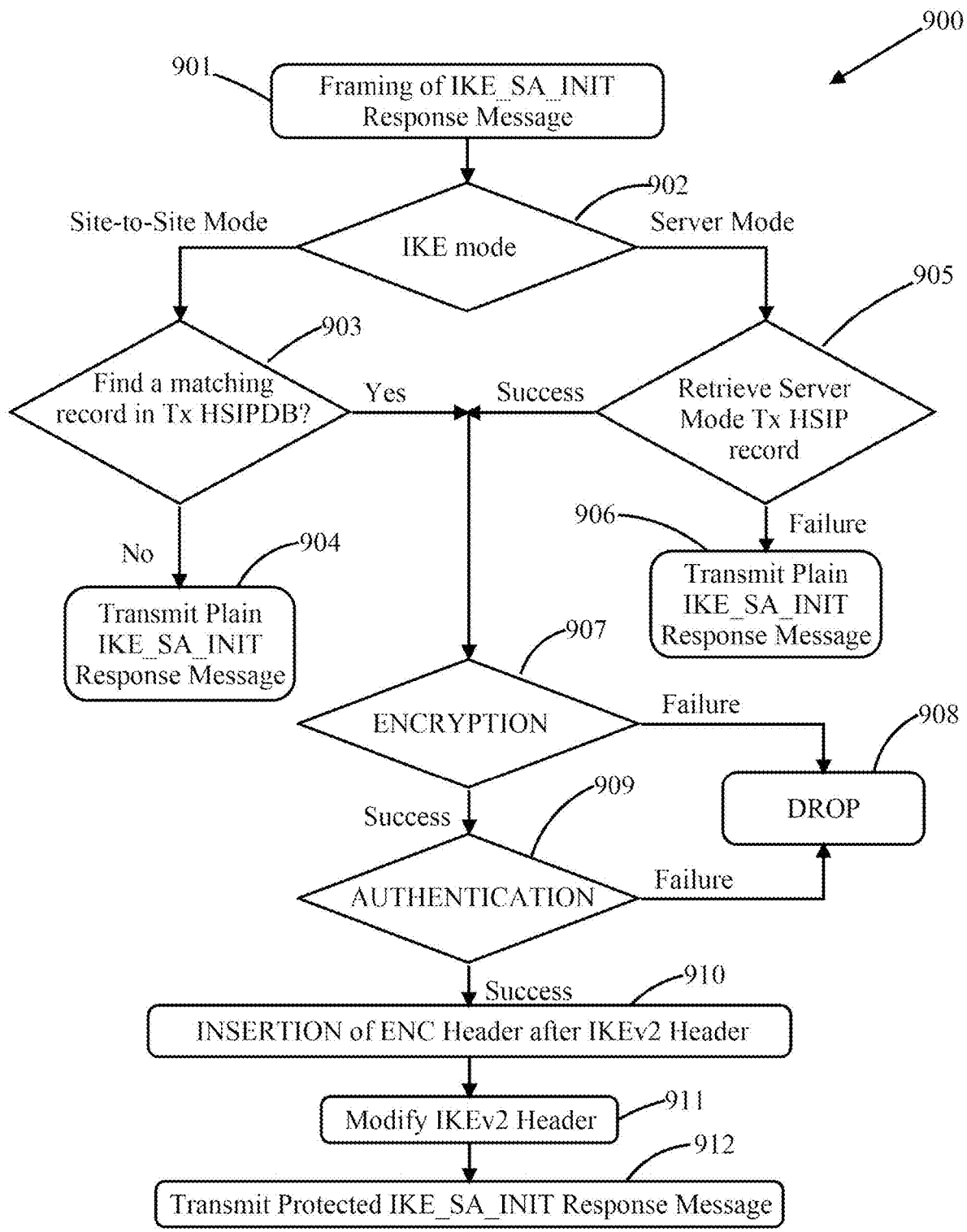
FIG. 9 illustrates a system and method for framing of a Protected IKE_SA_INIT Response Message in accordance with embodiments of the present invention.

As will be further described with respect to FIGS. 7 and 9, a selected HSIP record 400 within a Tx HSIPDB may be used for creating a Protected IKE_SA_INIT Request Message or a Protected IKE_SA_INIT Response Message by a gateway server (e.g., gateway servers 201, 202, 302) and/or a remote computer system (e.g., computer systems 304 . . . 306).

Figure 8:
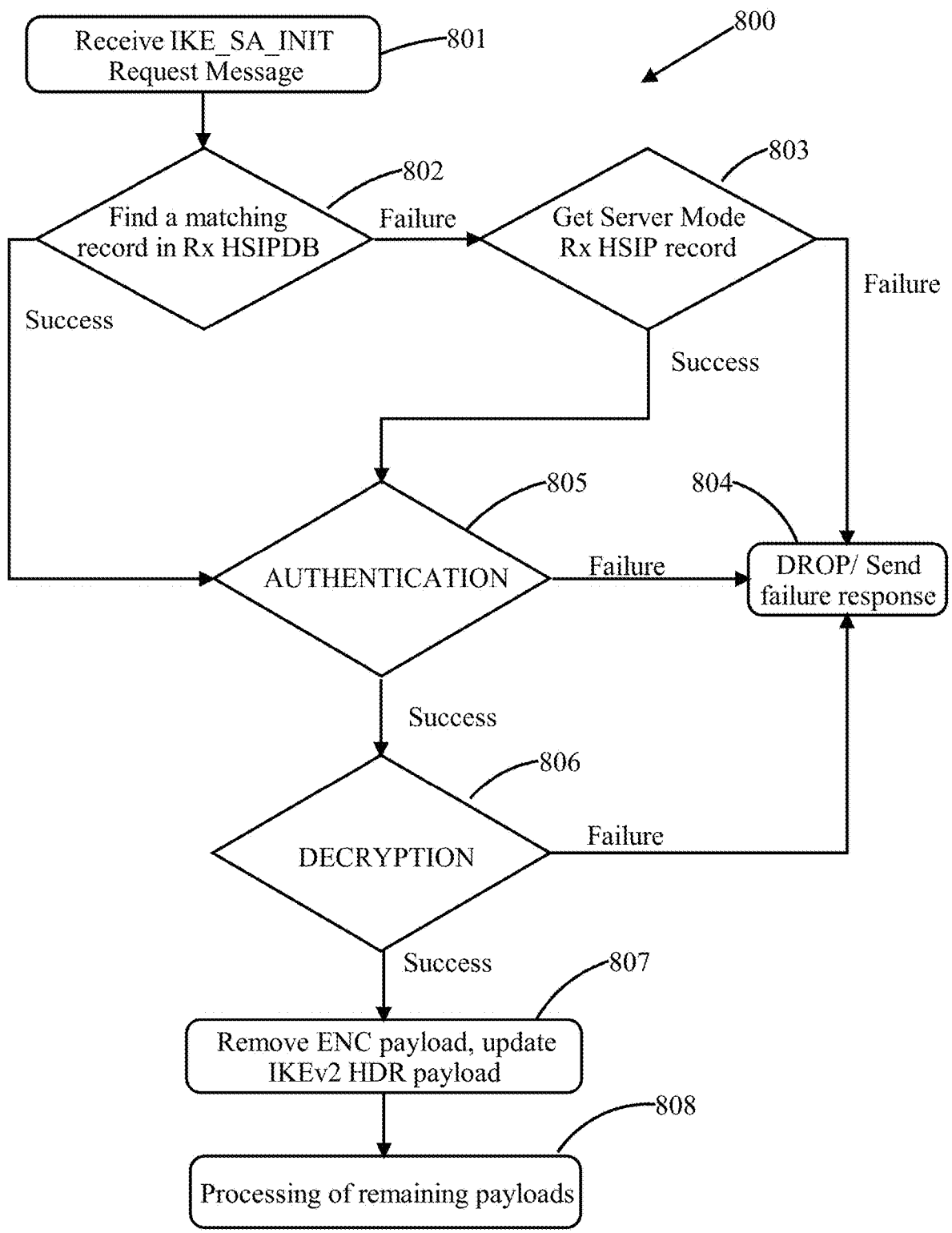
FIG. 8 illustrates a system and method for processing of a Protected IKE_SA_INIT Request Message in accordance with embodiments of the present invention.
Figure 10:
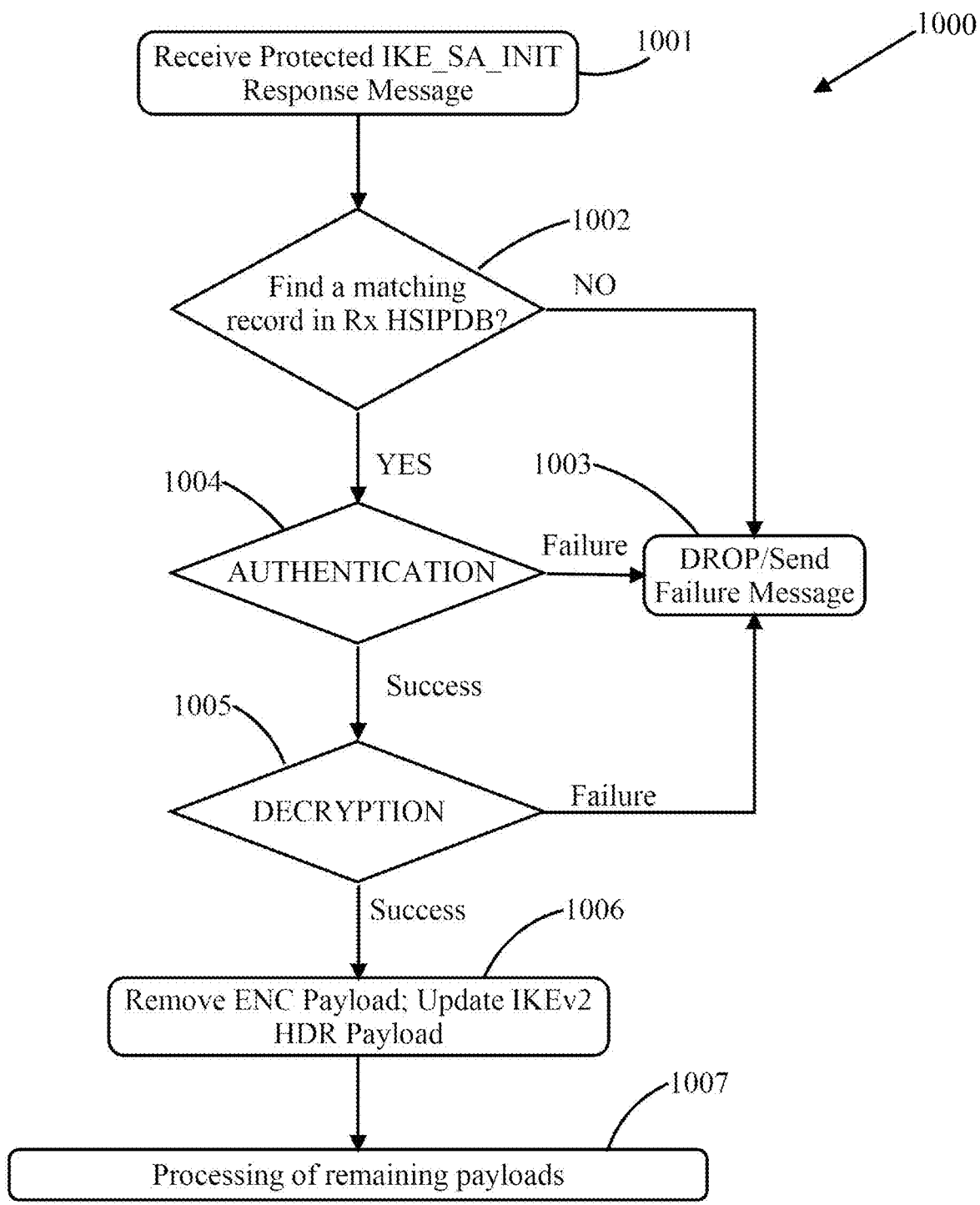
FIG. 10 illustrates a system and method for processing of a Protected IKE_SA_INIT Response Message in accordance with embodiments of the present invention.

As will be further described with respect to FIGS. 8 and 10, a selected HSIP record 400 within a Rx HSIPDB may be used for processing a received Protected IKE_SA_INIT Request Message or a received Protected IKE_SA_INIT Response Message. A Rx HSIPDB may be used to select a matching HSIP record 400 associated with a received IP address incorporated within a Protected IKE_SA_INIT Request Message and/or a Protected IKE_SA_INIT Response Message. Such an IP address pertains to the computer system that sent the Protected IKE_SA_INIT Request or Response Message.

Referring to again to FIG. 3, because of the inherent nature of this network deployment 300, an IP address identifying the remote user (e.g., the computer system(s) 304 . . . 306) on the network 303 may not be static, but instead may vary depending upon what network the remote user is currently connected to. In other words, the IP address identifying the remote user may be a varying temporary IP address. Within embodiments of the present invention, the gateway server 302 is operating as a server/responder-only to the one or more remote computer systems 304 . . . 306. In such scenarios when a gateway server 302 is operating as a server/responder-only, a Server Mode Tx HSIP record is used by the gateway server 302 while creating the Protected IKE_SA_INIT Response Message, as will be further described herein with respect to FIG. 9.

When embodiments of the present invention are implemented within a network deployment 300 where the gateway server 302 is operating as a server/responder-only, a Server Mode Rx HSIP record is utilized by the gateway server 302 while processing the received Protected IKE_SA_INIT Request Message, as will be further described herein.

Referring next to FIG. 6, there is illustrated a diagram depicting how an exchange of IKE_SA initiating messages is protected in accordance with embodiments of the present invention. Note that the protected IKE_SA_INIT message exchange 600 depicted in FIG. 6 may be implemented within any communication between computer systems over a network, including the exemplary network deployment 200 previously described with respect to FIG. 2, and the network deployment 300 previously described with respect to FIG. 3. Within the exemplary network deployment 200, the gateway servers 201, 202 can either operate as an Initiator 601 or a Responder 602 within the protected IKE_SA_INIT message exchange 600. Furthermore, within the exemplary network deployment 300, any one of the one or more computer systems 304 . . . 306 may operate as an initiator 601, and the gateway server 302 operates as a Responder within the protected IKE_SA_INIT message exchange 600 configured in accordance with embodiments of the present invention. Unlike with the current IKEv2 exchange protocol previously described with respect to FIG. 1, embodiments of the present invention provide protection (encryption and authentication) of the first pair of request/response messages. In other words, embodiments of the present invention create for transmission over a network (e.g., networks 203, 303) the Protected IKE_SA_INIT Request Message 603 and the Protected IKE_SA_INIT Response Message 604.

Within embodiments of the present invention, the Initiator 601 of the protected IKE_SA_INIT message exchange 600 will select an HSIP record 400 from one or more available HSIP records stored within its computer system (for example, see FIG. 5). The Initiator 601 will utilize the configured highly secured parameters 402-405 within the selected HSIP record 400 to create the encrypted payload (identified as "ENC") for framing the Protected IKE_SA_INIT Request Message 603. Such a framing of the Protected IKE_SA_INIT Request Message is performed by utilizing the configured highly secured parameters 402-405 within a selected HSIP record 400 to encrypt and authenticate the created payloads of a Plain IKE_SA_INIT Request Message, which may include the Security Association (SAIi) payload identifying and proposing the one or more SA cryptographic algorithm(s) supported by the Initiator 601 along with a proposal substructure (PROP) and one or more transform substructures (XFORM), the key exchange payload (Kei) for sending a Diffie-Hellman value of the Initiator 601, and a nonce payload (Ni) that includes a one-time random number generated by the Initiator 601. Further payloads may also be included, such as a NAT destination payload (NAT-Dest) and a NAT source payload (NAT-Src). This is further described herein with respect to FIG. 7.

After receipt and processing of the Protected IKE_SA_INIT Request Message 603 by the Responder 602, the Responder 602 selects one of the cryptographic algorithms from the choices proposed by the Initiator 601, and expresses that selection in the SAr1 payload, completes the exchange of the key exchange information (e.g., the Diffie-Hellman exchange) with the KEr payload, and sends its nonce in the Nr payload. The Responder 602 will then select an HSIP record 400 and utilize its configured highly secured parameters 402-405 to protect (encrypt and authenticate) these payloads, and will then create the encrypted payload "ENC" for framing the Protected IKE_SA_INIT Response Message 604, which is returned to the Initiator 601. Such a framing of the Protected IKE_SA_INIT Response Message is performed by utilizing the configured highly secured parameters 402-405 within the selected HSIP record 400 to encrypt and authenticate the payloads of a Plain IKE_SA_INIT Response Message, which may include the SAr1, PROP, XFORM, KEr, and Nr payloads, along with other optional payloads, such as NAT-Dest and NAT-Src.

Within Site-to-Site deployment modes, such as illustrated in FIG. 2, each of the gateway servers 201, 202 can operate as the initiator 601 or the Responder 602. In such a network deployment 200, each gateway server 201, 202 is configured with a specific IP address. Embodiments of the present invention operating in each of these gateway servers 201, 202 are configured to utilize HSIP record(s) 400 within a stored Tx HSIPDB for the framing of the Protected IKE_SA_INIT Request Message 603 and the Protected IKE_SA_INIT Response Message 604. Additionally, embodiments of the present invention operating in each of these gateway servers 201, 202 are configured to utilize HSIP record(s) 400 within a stored Rx HSIPDB for the processing (authentication and decryption) of the Protected IKE_SA_INIT Request Message 603 and the Protected IKE_SA_INIT Response Message 604.

Within remote access deployments, such as illustrated in FIG. 3, embodiments of the present invention operating in each of the remote computer systems 304 . . . 306 function as an Initiator 601, while embodiments of the present invention running on the gateway server 302 function as a Responder 602. Embodiments of the present invention operating in one of the remote computer systems 304 . . . 306 will select an HSIP record 400 from the Tx HSIPDB with an IP address matching the IP address of the gateway server 302 for framing of a Protected IKE_SA_INIT Request Message 603. Upon receipt of a Protected IKE_SA_INIT Response Message 604 from the gateway server 302, the remote computer system 304 . . . 306 will select an HSIP record 400 within its stored Rx HSIPDB that includes an IP address matching the IP address of the gateway server 302 for authentication and decryption of the received Protected IKE_SA_INIT Response Message 604.

Embodiments of the present invention operating within the gateway server 302 will select a Server Mode Rx HSIP record for authentication and decryption of a Protected IKE_SA_INIT Request Message 603 received from one of the computer system(s) 304 . . . 306. Embodiments of the present invention operating within the gateway server 302 will select the Server Mode Tx HSIP record for framing a Protected IKE_SA_INIT Response Message 604 to be transmitted to one of the computer system(s) 304 . . . 306.

As will now be described with respect to FIGS. 7-10, protection of the exchange of IKE_SA_INIT messages with highly secured IKEv2 parameters 402-405 contained within an HSIP record 400 may be performed as follows:

1. Framing of a Protected IKE_SA_INIT Request Message in accordance with the system and method 700 described herein with respect to FIG. 7.

2. Processing of a received Protected IKE_SA_INIT Request Message in accordance with the system and method 800 described herein with respect to FIG. 8.

3. Framing of a Protected IKE_SA_INIT Response Message in accordance with the system and method 900 described herein with respect to FIG. 9.

4. Processing of a received Protected IKE_SA_INIT Response Message in accordance with the system and method 1000 described herein with respect to FIG. 10.

Referring to FIG. 7, there is illustrated a system and method 700, configured in accordance with embodiments of the present invention, for framing of a Protected IKE_SA_INIT Request Message 603. The system and method 700 may be performed within any one of the gateway servers 201, 202 of FIG. 2, the gateway server 302 of FIG. 3, or any one of the computer system(s) 304 ... 306 of FIG. 3. As shown in FIG. 6, a format of such a Protected IKE_SA_INIT Request Message 603 may include the following payloads: HDR, ENC, SAi1, PROP, XFORM, XFORM, XFORM, XFORM, KEi, Ni, NAT-Dest, NAT-Src. All of such payloads except for the ENC payload would be included within a prior art IKE_SA_INIT request message (i.e., a Plain IKE_SA_INIT Request Message), such as what is sent by an Initiator 101 within the prior art IKEv2 protocol previously described with respect to FIG. 1. In accordance with embodiments of the present invention, the Initiator 601 (e.g., gateway servers 201, 202, 302, and computer systems 304 ... 306) will form these payloads (other than the ENC payload) in a similar manner as disclosed within the RFC 7296, previously referenced herein.

In framing (creating) a Protected IKE_SA_INIT Request Message 603, the system and method 700 begins in the process block 701 with a Plain IKE_SA_INIT Request Message. Then, in the process block 702, the system and method 700 searches within its stored Tx HSIPDB for an HSIP record 400 to select that includes an IP address matching the IP address of the Responder 602.

If the system and method 700 is unable to find such a matching HSIP record within its Tx HSIPDB, then the system and method 700 proceeds to the process block 703 to send the Plain IKE_SA_INIT Request Message to the Responder 602. In such a situation, the initiator 601 and the Responder 602 may revert to implementing the prior art IKEv2 Key Exchange Protocol as previously described with respect to FIG. 1.

However, if the system and method 700 does find a matching HSIP record 400 within its Tx HSIPDB in the process block 702, the system and method 700 will proceed to the process block 704 with the HSIP record 400 that the system and method 700 selected as a function of the IP address of the Responder 602. In the process block 704, the system and method 700 will then attempt to perform an encryption of the Plain IKE_SA_INIT Request Message utilizing the matching HSIP record 400. If the system and method 700 is unable to successfully encrypt the Plain IKE_SA_INIT Request Message, the system and method 700 may proceed to the process block 705 whereby it will Drop further processing of the system and method 700. Alternatively, the system and method 700 may be programmed to retry the encryption of the Plain IKE_SA_INIT Request Message one or more times. Failure of the system and method 700 to encrypt the Plain IKE_SA_INIT Request Message may occur for one or more various hardware/software issues, or because the required hardware/software resources for performing the encryption are unavailable at that time.

If the system and method 700 is capable of successfully encrypting the Plain IKE_SA_INIT Request Message within the process block 704, it will do so utilizing the encryption/decryption algorithm 401, encryption key length 402, and encryption key value(s) 403 contained within the selected HSIP record 400. Next, the system and method 700 will proceed to the process block 706 to perform authentication of the encrypted IKE_SA_INIT request message received from the process block 704. If the system and method 700 is unable to successfully authenticate the encrypted IKE_SA_INIT request message, the system and method 700 may proceed to the process block 707 to Drop the attempt of authentication, whereby the system and method 700 may be terminated. Alternatively, the system and method 700 may be programmed to retry the authentication by the process block 706 one or more times. As with the encryption by the process block 704, failure to successfully perform the authentication by the process block 706 may be caused by one or more various hardware/software issues, or because the required hardware/software resources within the system and method 700 are unavailable at that time.

If the system and method 700 is able to successfully authenticate the encrypted IKE_SA_INIT request message in the process block 706, then the system and method 700 will proceed to the process block 708.

In the process block 708, an ENC header is inserted after the IKE header (HDR). Formatting of such an ENC header by the system and method 700 may be performed in a similar manner as described within Section 3.14 of the RFC 7296 previously referenced herein.

Next, in the process block 709, the system and method 700 modifies the IKEv2 header (HDR) to indicate to the Responder 602 that this Protected IKE_SA_INIT Request Message 603 has been modified in accordance with embodiments of the present invention so that the Responder 602 processes the Protected IKE_SA_INIT Request Message 603 (as further described herein with respect to FIG. 8) differently than it would process a Plain IKE_SA_INIT Request Message.

Thereafter, in the process block 710, the system and method 700 will then cause the Initiator 601 to transmit the Protected IKE_SA_INIT Request Message 603 to the Responder 602.

As previously disclosed with respect to FIGS. 2 and 3, such a Protected IKE_SA_INIT Request Message 603 may be transmitted by an Initiator 601 to a Responder 602 over a network (e.g., networks 203, 303). As an example, with respect to FIG. 2, if the initiator 601 is the gateway server 201, then the Protected IKE_SA_INIT Request Message 603 may be transmitted over the network 203 to the destination gateway server 202 acting as the Responder 602. Within the exemplary deployment 300 previously disclosed with respect to FIG. 3, such an Initiator 601 may be any one of the computer system(s) 304 ... 306, whereby the Responder 602 is the gateway server 302.

Referring next to FIG. 8, there is illustrated a system and method 800 describing how embodiments of the present invention operating within the Responder 602 (e.g., the gateway servers 201, 202, 302, or the computer system(s) 304 ... 306) process the Protected IKE_SA_INIT Request Message 603 received from the Initiator 601. The system and method 800 receives the Protected IKE_SA_INIT Request Message 603 in the process block 801 whereby the system and method 800 recognizes that the received Protected IKE_SA_INIT Request Message 603 is not a Plain IKE_SA_INIT Request Message due to the fact that it includes the modified IKEv2 header (HDR) inserted by the Initiator 601 within the process block 709. Thus, if the Responder 602 had received a Plain IKE_SA_INIT Request Message, which would not include such a modified IKEv2 header (HDR), the Responder 602 may therefore process that message in a manner as previously described with respect to FIG. 1.

Upon receipt of the Protected IKE_SA_INIT Request Message 603 with the modified IKEv2 header (HDR), the system and method 800 will proceed to the process block 802. The process block 802 will, in accordance with embodiments of the present invention, search within its stored Rx HSIPDB for an HSIP record 400 that contains an IP address matching the IP address of the Initiator 601 (included as part of the IP header). The process block 802 may be initially performed because if both the Initiator 601 and the Responder 602 are gateway servers (e.g., gateway servers 201, 202), then the system and method 800 will determine that the received Protected IKE_SA_INIT Request Message 603 is being received within a Site-to-Site deployment mode, such as previously described with respect to FIG. 2.

If, in the process block 802, the Responder 602 is able to successfully find a matching HSIP record in its stored Rx HSIPDB, then the system and method 800 will proceed to the process block 805 to perform authentication of the received Protected IKE_SA_INIT Request Message 603. The process block 805 will attempt to perform such an authentication using the matching HSIP record 400 found within its stored Rx HSIPDB, which should include an authentication algorithm 404 and authentication key value(s) 405.

If the system and method 800 is unable to successfully authenticate the received Protected IKE_SA_INIT Request Message 603 in the process block 805, then the system and method 800 may proceed to the process block 804 to thereby Drop the attempt at authentication and discontinue further processing of the Protected IKE_SA_INIT Request Message 603. The process block 804 may further transmit back to the Initiator 601 a failure response message that the Responder 602 was unable to authenticate the received Protected IKE_SA_INIT Request Message 603. Such a failure to perform the authentication in the process block 805 may occur as a result of one or more various hardware/software issues, the unavailability of the required hardware/software resources to perform the authentication, a mismatch in the configurations of HSIP records between the Initiator 601 and the Responder 602, or some type of third party attack (e.g., man-in-the-middle attack). Alternatively, the system and method 800 may attempt to retry the authentication of the received Protected IKE_SA_INIT Request Message 603 by the process block 805 one or more times as pre-programmed within the system and method 800.

If the system and method 800 is able to successfully authenticate the received Protected IKE_SA_INIT Request Message 603 in the process block 805, then the system and method 800 will proceed to the process block 806 to perform decryption of the authenticated Protected IKE_SA_INIT Request Message 603. Decryption will be performed utilizing the encryption/decryption algorithm 401, encryption key length 402, and encryption key value(s) 403 contained within the HSIP record 400 found by the process block 802.

If the system and method 800 fails to successfully decrypt the authenticated Protected IKE_SA_INIT Request Message 603, then the system and method 800 may proceed to the process block 804 to Drop further processing of the received Protected IKE_SA_INIT Request Message 603. This may occur because of one of various hardware/software issues, or because the required hardware/software resources within the computer system of the Responder 602 are unavailable for performing the decryption within the process block 806. The system and method 800 may further then send a failure response message back to the initiator 601 that it was unable to decrypt the received Protected IKE_SA_INIT Request Message 603. Alternatively, the system and method 800 may retry performance of the decryption in the process block 806 for one or more times.

If the process block 806 is able to successfully decrypt the authenticated Protected IKE_SA_INIT Request Message 603, then the system and method 800 will proceed to the process block 807 to remove the ENC payload from the Protected IKE_SA_INIT Request Message 603. The process block 807 may further update the IKE header (HDR) payload to take into account that the next payload is the SAi1 payload, and that the total length of the message no longer includes the ENC payload. Removal of the ENC payload by the process block 807 results in the received message now being formatted similar to a Plain IKE_SA_INIT Request Message.

Thereafter, in the process block 808, the system and method 800 may then perform processing of the remaining payloads within the now transformed request message, in accordance with the protocols set forth within the RFC 7296, previously referenced herein.

Returning to the process block 802, if upon receipt of the Protected IKE_SA_INIT Request Message 603, the system and method 800 is unable to successfully find a matching HSIP record within its Rx HSIPDB, the system and method 800 may proceed to the process block 803. Recall that the received Protected IKE_SA_INIT Request Message 603 has a modified IKEv2 header (HDR) produced by the Initiator 601 (see the process block 709 of FIG. 7) indicating that the received Protected IKE_SA_INIT Request Message 603 is not formatted as a Plain IKE_SA_INIT Request Message. Therefore, though the system and method 800 was unable, in the process block 802, to successfully find a matching HSIP record 400 within its Rx HSIPDB, the system and method 800 may continue to process the received Protected IKE_SA_INIT Request Message 603 as occurring within a communication between an Initiator 601 and a Responder 602 under a network deployment 300 (i.e., Server Mode) such as previously described with respect to FIG. 3. In such a situation, one of the remote computer system(s) 304 . . . 306, operating as an Initiator 601, sent the Protected IKE_SA_INIT Request Message 603 over a network 303 in an attempt to establish a secure communication with the gateway server 302. Further recall that in such a network deployment 300, the IP address of the remote computer system(s) 304 . . . 306 varies and is not static (i.e., is a varying temporary IP address). Consequently, that is the reason that the process block 802 was unable to successfully find a matching HSIP record 400 within its stored Rx HSIPDB, since there is no such HSIP record 400 in the Rx HSIPDB having an IP address that matches the IP address of the Initiator 601 (e.g., computer system(s) 304 . . . 306). Further recall that with such remote access situations, the gateway server 302 will then retrieve the Server Mode Rx HSIP record 400 previously stored therein for successfully processing such a Protected IKE_SA_INIT Request Message 603 received from such a remote computer system.

If, in the process block 803, the system and method 800 is unable to successfully retrieve its Server Mode Rx HSIP record 400, the system and method 800 will proceed to the previously described process block 804. Such a failure to retrieve the Server Mode Rx HSIP record by the process block 803 may occur as a result of one or more various hardware/software issues, the unavailability of hardware/software resources for performing such a retrieval of the Server Mode Rx HSIP record, a mismatch in the configurations of HSIP records between the initiator 601 and the Responder 602, or some type of third party attack (e.g., man-in-the-middle attack). Alternatively, the system and method 800 may be pre-programmed to retry the retrieval of the Server Mode Rx HSIP record 400 by the process block 803 one or more times. Furthermore, within the process block 804, the system and method 800 may send a failure response message back to the Initiator 601 (e.g., the computer system(s) 304 . . . 306) that it was unable to successfully process the received Protected IKE_SA_INIT Request Message 603.

If the process block 803 was able to successfully retrieve the Server Mode Rx HSIP record 400, then the system and method 800 will proceed to perform the previously described operations within the process blocks 805-808.

After the Responder 602 has processed the remaining payloads in the process block 808, the Responder 602 may then proceed to frame a Protected IKE_SA_INIT Response Message 604 in accordance with embodiments of the present invention Referring to FIG. 9, embodiments of the present invention operating within the Responder 602 will initiate, in the process block 901, the framing of a Plain IKE_SA_INIT Response Message to transform it into a Protected IKE_SA_INIT Response Message. Such a Plain IKE_SA_INIT Response Message may be formatted similar to how such messages are produced in accordance with the IKEv2 Key Exchange Protocol disclosed within the RFC 7296 previously referenced herein.

In the process block 902, the system and method 900 will determine whether to frame the Plain IKE_SA_INIT Response Message as a Protected IKE_SA_INIT Response Message 604 in accordance with embodiments of the present invention as a function of what type of network deployment the Protected IKE_SA_INIT Request Message 603 was received (e.g., within either a Site-to-Site Mode or a Server Mode).

The system and method 900 will know to frame the Plain IKE_SA_INIT Response Message as a Protected IKE_SA_INIT Response Message 604 under a Site-to-Site Mode when the system and method 800 operating within the Responder 602 was able to successfully find a matching HSIP record in its stored Rx HSIPDB (see the process block 802 previously described with respect to FIG. 8).

The system and method 900 will know to frame the Plain IKE_SA_INIT Response Message as a Protected IKE_SA_INIT Response Message 604 under a Server Mode when the system and method 800 operating in the Responder 602 had to previously process the received Protected IKE_SA_INIT Request Message 603 utilizing a Server Mode Rx HSIP record, as performed within the process block 803.

If the system and method 900 determines in the process block 902 that it needs to frame the Plain IKE_SA_INIT Response Message as a Protected IKE_SA_INIT Response Message 604 under a Site-to-Site Mode, it will proceed to the process block 903. If the system and method 900 determines in the process block 902 that it needs to frame the Plain IKE_SA_INIT Response Message as a Protected IKE_SA_INIT Response Message 604 under a Server Mode, it will proceed to the process block 905.

If the system and method 900 proceeds under the Site-to-Site Mode, then in the process block 903, the system and method 900 will attempt to find an HSIP record 400 in its stored Tx HSIPDB that contains an IP address matching the IP address of the Initiator 601. If the process block 903 is unable to successfully find such a matching HSIP record 400, then the system and method 900 will proceed to the process block 904 to transmit the Plain IKE_SA_INIT Response Message back to the Initiator 601 in the process block 904.

However, if in the process block 903, the system and method 900 is able to successfully find a matching HSIP record 400 in its stored Tx HSIPDB, the system and method 900 will proceed to the process block 907, described hereinafter, with the HSIP record 400 that the system and method 900 selected as a function of the IP address of the Initiator 601.

If the system and method 900 determines in the process block 902 that it is to frame a Plain IKE_SA_INIT Response. Message as a Protected IKE_SA_INIT Response Message 604 under a Server Mode, then in the process block 905, the system and method 900 will retrieve a Server Mode Tx HSIP record 400 for utilization in framing the Plain IKE_SA_INIT Response Message as a Protected IKE_SA_INIT Response Message 604. If the process block 905 is unable to retrieve such a Server Mode Tx HSIP record 400, then in the process block 906, the system and method 900 will transmit the Plain IKE_SA_INIT Response Message from the Responder 602 back to the Initiator 601.

Upon retrieval of an appropriate HSIP record 400 by either of the process blocks 903 or 905, the system and method 900 will then attempt to encrypt the Plain IKE_SA_INIT Response Message utilizing the encryption/decryption algorithm 401, encryption key length 402, and encryption key value(s) 403 contained within the selected HSIP record 400. If the system and method 900 is unable to successfully encrypt the Plain IKE_SA_INIT Response Message, then the system and method 900 may proceed to the process block 908 to Drop further processing of the framing of a Protected IKE_SA_INIT Response Message. Additionally, the system and method 900 may send a failure response message back to the initiator 601.

Such a failure to perform the encryption within the process block 907 may occur as a result of one or more various hardware/software issues, or an unavailability of the appropriate hardware/software resources for performing the encryption.

If the system and method is able to successfully perform the encryption in the process block 907, then in the process block 909, the system and method 900 will attempt to perform an authentication of the encrypted IKE_SA_INIT response message utilizing the authentication algorithm 404 and authentication key value(s) 405 contained within the retrieved HSIP record 400. If the authentication is not successful within the process block 909, then the system and method 900 may proceed to the process block 908 to Drop further processing of the framing of a Protected IKE_SA_INIT Response Message 604. Alternatively, the system and method 900 may be pre-programmed to retry the authentication within the process block 909 for one or more times.

Upon successful authentication of the encrypted IKE_SA_INIT response message in the process block 909, the system and method 900 will proceed to the process block 910 to insert an ENC header (ENC) after the IKEv2 header (HDR) within the Protected IKE_SA_INIT Response Message 604. Insertion of such an ENC header by the process block 910 may be performed in accordance with the procedures outlined within Section 3.14 of the RFC 7296, previously referenced herein.

Thereafter, in the process block 911, the system and method 900 will modify the IKEv2 header (HDR) so that it includes an indication to the Initiator 601 that the response message is a Protected IKE_SA_INIT Response Message 604 as configured in accordance with embodiments of the present invention.

Thereafter, in the process block 912, the system and method 900 will cause the Responder 602 to transmit the Protected IKE_SA_INIT Response Message 604 back to the Initiator 601 (see FIG. 6).

Recall that the framing of a Protected IKE_SA_INIT Response Message 604 by the system and method 900 is performed under the Site-to-Site Mode for a situation where the Initiator 601 and the Responder 602 are gateway servers attempting to establish a secure communication channel over a network deployment 203, such as previously described with respect to FIG. 2. If the Protected IKE_SA_INIT Response Message 604 was framed by the system and method 900 under the Server Mode, then the Protected IKE_SA_INIT Response Message 604 is being transmitted by the process block 912 from a gateway server (e.g., the gateway server 302) back to one of the computer system(s) 304 . . . 306 to establish a secure communication channel over a network, such as within the network deployment 303 previously described with respect to FIG. 3. The Initiator 601 in either of such deployments (e.g., the gateway server 201 or one of the computer system(s) 304 . . . 306) will then process the received Protected IKE_SA_INIT Response Message 604 in accordance with the system and method 1000 illustrated in FIG. 10.

Referring to FIG. 10, in the process block 1001, the Initiator 601 will begin processing of the Protected IKE_SA_INIT Response Message 604 by the system and method 1000 upon recognizing that the received message is framed as a Protected IKE_SA_INIT Response Message 604. The Initiator 601 will know to process the received IKE_SA_INIT response message as one that has been framed as a Protected IKE_SA_INIT Response Message 604 due to the modified IKEv2 header (HDR) inserted by the process block 911. If the Initiator 601 recognizes that the IKEv2 header (HDR) has not been modified (as performed within the process block 912), then the initiator 601 may then proceed to process the received message as a Plain IKE_SA_INIT Response Message, such as previously disclosed with respect to FIG. 1.

Upon recognition that the received message by the Initiator 601 is a Protected IKE_SA_INIT Response Message 604 configured in accordance with embodiments of the present invention, the system and method 1000 will proceed to the process block 1002 to search for an HSIP record 400 within its stored Rx HSIPDB containing an IP address that matches the IP address of the Responder 601.

If the system and method 1000 is unable to find such a matching HSIP record 400 in the process block 1002, then the system and method 1000 will proceed to the process block 1003 to Drop further processing of the received Protected IKE_SA_INIT Response Message 604. Alternatively, the system and method 1000 may be pre-programed to retry sending the protected IKE_SA_INIT Request Message 603 if the Initiator 601 does not receive a response back from the Responder 602 within a predetermined time interval.

If the system and method 1000 is able to successfully find a matching HSIP record 400 in the process block 1002, then the system and method 1000 will proceed to the process block 1004 to perform authentication of the received Protected IKE_SA_INIT Response Message 604 utilizing the authentication algorithm 404 and authentication key value(s) 405 contained within the retrieved HSIP record 400. If the system and method 1000 is unable to successfully authenticate the received Protected IKE_SA_INIT Response Message 604 within the process block 1004, then the system and method 1000 may proceed to the process block 1003 to Drop further processing of the Protected IKE_SA_INIT Response Message 604. Alternatively, the system and method 1000 may be pre-programmed to retry sending the protected IKE_SA_INIT Response Message 604 if the Responder 602 does not receive a response back from the initiator 601 within a predetermined time interval.

If the system and method 1000 is able to successfully authenticate the received Protected IKE_SA_INIT Response Message 604 in the process block 1004, then the system and method 1000 will proceed to the process block 1005. Within the process block 1005, the system and method 1000 will attempt to perform decryption of the authenticated Protected IKE_SA_INIT Response Message 604 utilizing the encryption/decryption algorithm 401, encryption key length 402, and encryption key value(s) 403 contained within HSIP record 400 selected within the process block 1002. If the system and method 1000 is unable to successfully decrypt the authenticated Protected IKE_SA_INIT Response Message 604, then the system and method 1000 will proceed to the process block 1003 to Drop further processing of the Protected IKE_SA_INIT Response Message 604. Alternatively, the system and method 1000 may be pre-programmed to retry sending the protected IKE_SA_INIT Response Message 604 if the Responder 602 does not receive a response back from the Initiator 601 within a predetermined time interval.

Note that within any one or more of the process blocks 1002, 1004, and 1005, the system and method 1000 may proceed to the process block 1003 due to a failure caused by one or more various hardware/software issues, the unavailability of the hardware/software resources required to perform the processing of the Protected IKE_SA_INIT Response Message 604 by such process blocks 1002, 1004, and 1005, a mismatch in the configurations of HSIP records between the initiator 601 and the Responder 602, or some type of third party attack (e.g., man-in-the-middle attack).

If the system and method 1000 is able to successfully decrypt the authenticated Protected IKE_SA_INIT Response Message 604 in the process block 1005, then the system and method 1000 will proceed to the process block 1006 to remove the ENC payload from the Protected IKE_SA_INIT Response Message 604. Furthermore, the system and method 1000 may update the IKE header payload (HDR) of the Protected IKE_SA_INIT Response Message 604 so that it indicates that it is now formatted as a Plain IKE_SA_INIT Response Message. Thereafter, in the process block 1007, the system and method 1000 will process the remaining payloads of the now formatted Plain IKE_SA_INIT Response Message in a manner as disclosed within the RFC 7296 previously referenced herein.

Figure 1:
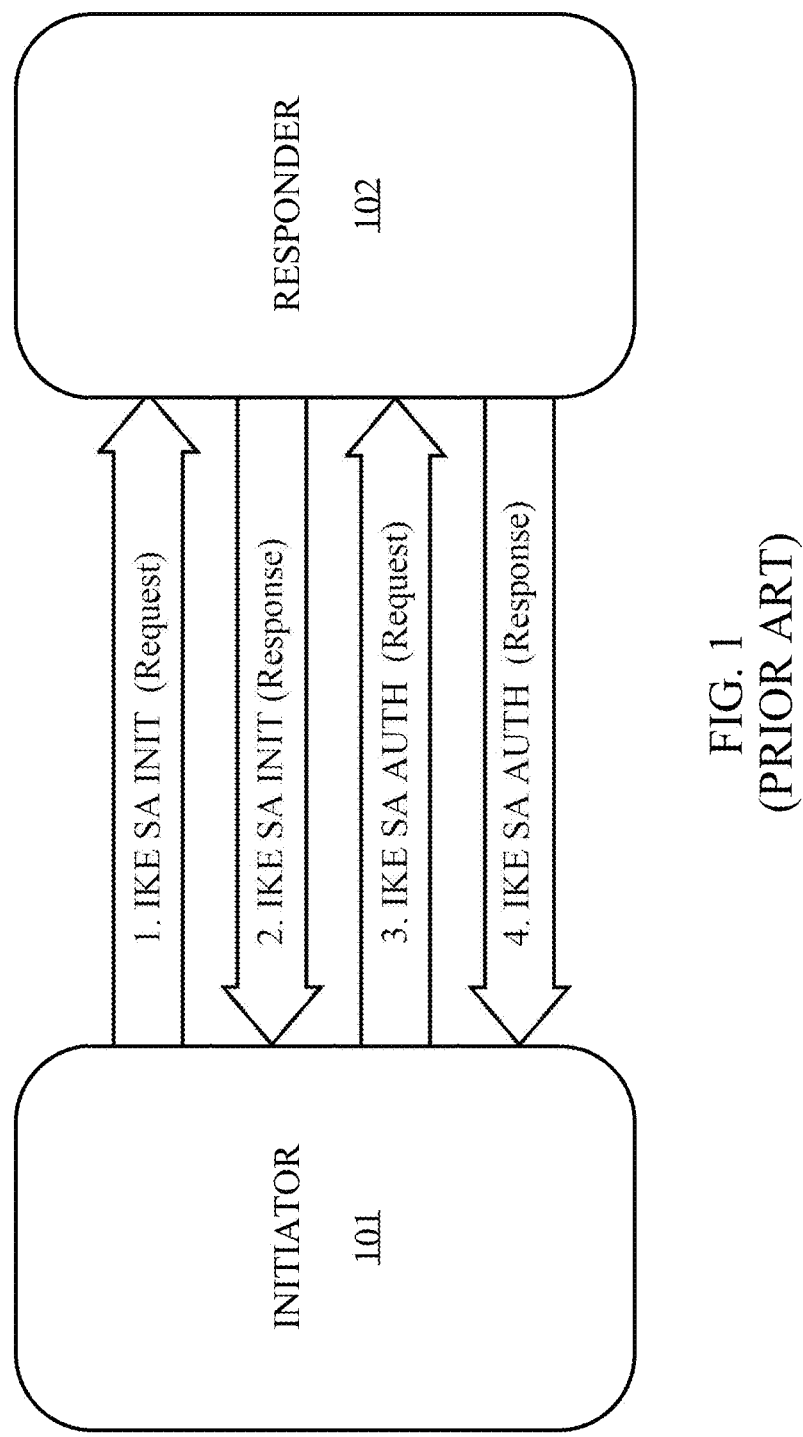
FIG. 1 illustrates a diagram showing prior art IKEv2 messages exchanged between an Initiator and a Responder.

Thereafter, the Initiator 601 and the Responder 602 may proceed to perform the IKE_AUTH exchange of messages as previously illustrated with respect to FIG. 1, and as described within the RFC 7296 previously referenced herein.

Figure 11:
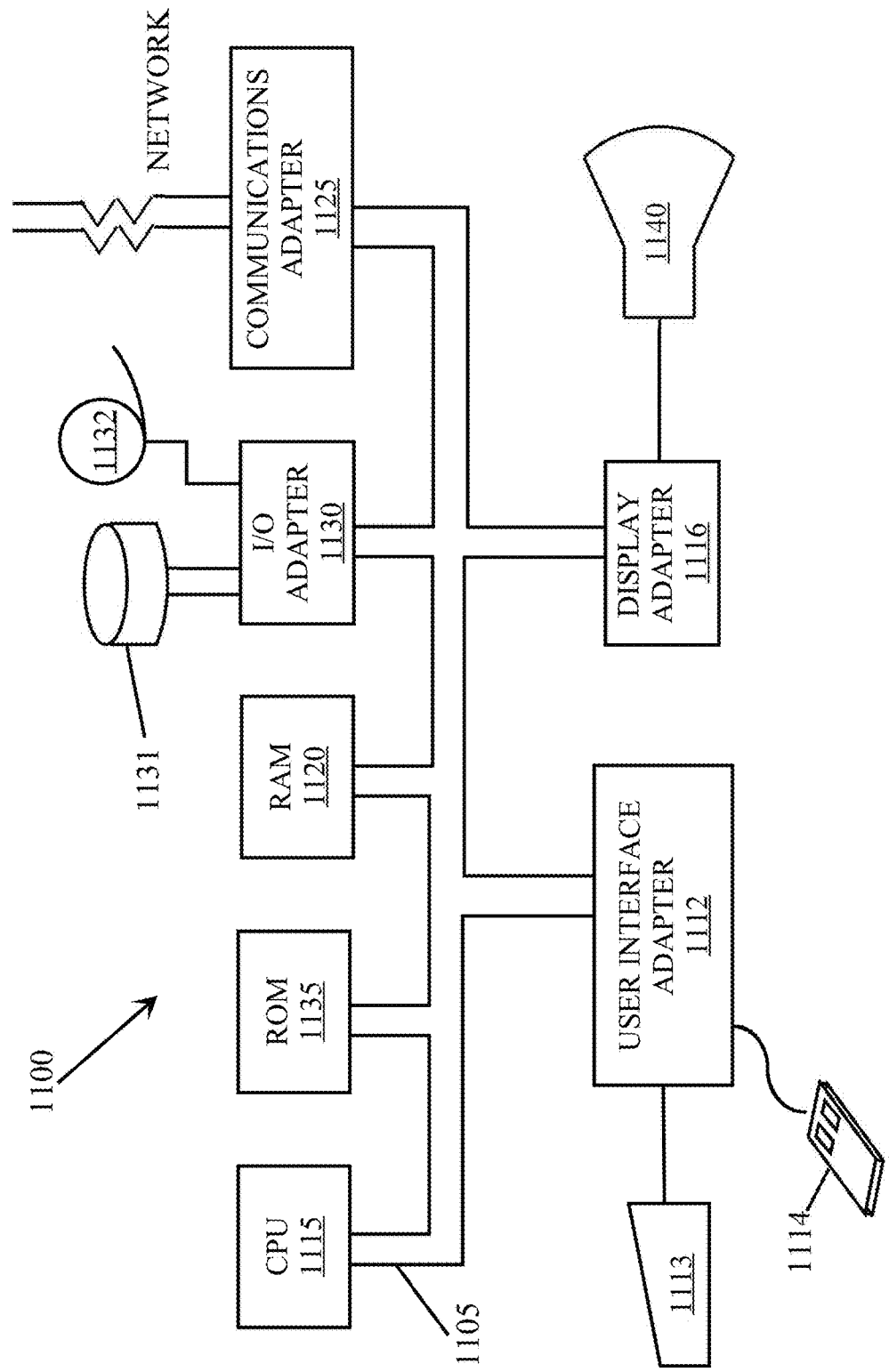
FIG. 11 illustrates a data processing system configured in accordance with embodiments of the present invention.

With reference now to FIG. 11, a block diagram illustrating a computer system is depicted in which embodiments of the present invention may be implemented. Any one or more of the computer systems 205-207, 215-217, 304-306, and 315-317, and any one or more gateway servers 201, 202, 302 may be configured in a manner similar to the computer system 1100. The computer system 1100 may employ a local bus 1105, such as a PCI bus, or some other bus architectures such as Accelerated Graphics Port ("AGP") and Industry Standard Architecture ("ISA"), among others. The processor ("CPU") 1115, volatile memory ("RAM") 1120, and non-volatile memory ("ROM") 1135 may be connected to the local bus 1105 in any well-known manner (e.g., through a PCI Bridge (not shown), which may also include an integrated memory controller and cache memory for the processor 1115). Additional connections to the local bus 1105 may be made through direct component interconnections or through add-in boards. One or more communications adapter(s) 1125 may be coupled to the local bus 1105. Such communications adapter(s) 1125 provide one or more communication channel(s) between the computer system 1100 and one or more networks (e.g., the networks 203, 204, 214, 303, and 314).

A user interface adapter 1130 may provide a connection for a keyboard 1131 and a mouse 1132 (and any other well-known user interface devices). An I/O adapter 1140 may provide a connection for a hard disk drive 1141, a tape drive 1142, and a CD-ROM drive (not shown) and any other well-known storage devices, such as those previously mentioned.

An operating system may be run on the processor 1115 and used to coordinate and provide control of various components within the computer system 1100. The operating system may be a commercially available operating system. An object-oriented programming system, such as Java, may run in conjunction with the operating system and provide calls to the operating system from Java programs or programs executing on the system 1100. Instructions for the operating system, the object-oriented operating system, and programs may be located on non-volatile memory storage devices, such as the hard disk drive 1141, and may be loaded into volatile memory (e.g., RAM 1120) for execution by the processor 1115.

Those of ordinary skill in the art will appreciate that the hardware in FIG. 11 may vary depending on the implementation (e.g., see FIGS. 2 and 3). Other internal hardware or peripheral devices, such as flash ROM (or equivalent non-volatile memory) or optical disk drives and the like, may be used in addition to or in place of the hardware depicted in FIG. 11. Also, the system and processes of the present invention may be applied to a multiprocessor computer system.

The depicted example in FIG. 11 and above-described examples are not meant to imply architectural limitations. Further, a computer program form of the present invention may reside on any computer readable storage medium (i.e., floppy disk, compact disk, hard disk (e.g., 1141), tape drive (e.g., 1142), ROM 1135, RAM 1120, etc.) used by a computer system. (The terms "computer," "system," and "computer system" may be used interchangeably herein.)

Aspects of the present invention may be a system, a method, and/or a computer program product at any possible technical detail level of integration. The computer program product may include a computer readable storage medium (or media) having computer readable program instructions thereon for causing a processor 1115 (such as implemented within any of the gateway servers 201, 202, 302 and the computer systems 304 . . . 306) to carry out aspects of the present invention.

The computer readable storage medium can be a tangible device that can retain and store instructions for use by such a processor 1115. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk 1141, a random access memory ("RAM") 1120, a read-only memory ("ROM") 1135, an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (e.g., LANs 204, 214, 314), a wide area network (e.g., networks 203, 303), and/or a wireless network. The network may include copper transmission cables, optical transmission fibers, wireless transmission, routers, firewalls, switches, gateway computers, and/or edge servers. A network adapter card or network interface (e.g., communication adapter 1125) in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any one or more blocks of the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the functions/acts specified in any one or more blocks of the flowchart illustrations and/or block diagrams. Embodiments of the present invention may be performed by an IKE daemon that runs in user space and an IPsec stack in the kernel that processes the actual IP packets.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in any one or more blocks of the flowchart illustrations and/or block diagrams.

The flowchart illustrations and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

As will be appreciated by one skilled in the art, aspects of the present invention may be embodied as a system, method, and/or program product. Accordingly, aspects of the present invention may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

Association of certain data (e.g., within a HSIPDB) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Aspects of the present invention provide, in a computer system, a method including creating payloads for negotiation of an IKE SA for establishing a secure communication channel over a network, wherein the payloads include a list of one or more proposed SA cryptographic algorithms supported by the computer system, key exchange information, and a nonce; encrypting the payloads with a selected first cryptographic suite; and framing an IKE SA initiating message that includes the encrypted payloads. The framed IKE SA initiating message may include a header identifying a version of a protocol of the Internet Key Exchange, and the payload including the key exchange information may include one or more Diffie-Hellman values. The first cryptographic suite may be selected as a function of an IP address associated with a destination gateway server to which the framed IKE SA initiating message is to be transmitted over the network by the computer system. The method may further include decrypting a received IKE SA response message with a second cryptographic suite selected as a function of an IP address associated with a destination gateway server that sent the IKE SA response message. The first cryptographic suite may be configured for the negotiation of the IKE SA with a remote computer system connected to the network, wherein the remote computer system is identified on the network with a varying temporary internet protocol address. In aspects of the present invention, the IKE SA initiating message is an IKEv2 SA initiating request message. In aspects of the present invention, the IKE SA initiating message is an IKEv2 SA initiating response message.

Aspects of the present invention provide a method for negotiating an IKEv2 SA for establishing a secure communication channel over a network between an initiator and a responder, the method including the initiator encrypting payloads of an IKEv2 SA initiating request message with a selected first cryptographic suite, wherein the payloads of the IKEv2 SA initiating request message include a list of one or more proposed SA cryptographic algorithms supported by the initiator, key exchange information, and the initiator's nonce; the initiator framing a protected IKEv2 SA initiating request message that includes the encrypted payloads; the initiator transmitting the framed protected IKEv2 SA initiating request message over the network to the responder; the responder receiving the framed protected IKEv2 SA initiating request message; the responder decrypting the payloads of the received protected IKEv2 SA initiating request message; the responder processing the payloads from the received and decrypted protected IKEv2 SA initiating request message; the responder encrypting payloads of an IKEv2 SA initiating response message with a selected second cryptographic suite, wherein the payloads of the IKEv2 SA initiating response message include a selection of one of the one or more proposed SA cryptographic algorithms supported by the initiator, key exchange information, and the responder's nonce; the responder framing a protected IKEv2 SA initiating response message that includes the encrypted payloads; the responder transmitting the framed protected IKEv2 SA initiating response message over the network to the initiator; the initiator receiving the framed protected IKEv2 SA initiating response message; the initiator decrypting the payloads of the received protected IKEv2 SA initiating response message; and the initiator processing the payloads from the received and decrypted protected IKEv2 SA initiating response message. The encrypting payloads of the IKEv2 SA initiating request message with the selected first cryptographic suite may further include authenticating the payloads of the IKEv2 SA initiating request message with a first authentication algorithm contained within the selected first cryptographic suite, wherein the responder encrypting payloads of the IKEv2 SA initiating response message with the selected second cryptographic suite further includes authenticating the payloads of the IKEv2 SA initiating response message with a second authentication algorithm contained within the selected second cryptographic suite. The method may further include the initiator framing an IKEv2 SA authorization request message, and the initiator transmitting the framed IKEv2 SA authorization request message over the network to the responder. The initiator may be a first gateway server that is identified on the network with a first IP address, wherein the responder may be a second gateway server that is identified on the network with a second IP address, wherein the first cryptographic suite may be selected from a first database containing a first plurality of cryptographic suites, each of the first plurality of cryptographic suites being associated with a first specific set of IP addresses of gateway servers coupled to the network, wherein the second cryptographic suite may be selected from a second database containing a second plurality of cryptographic suites, each of the second plurality of cryptographic suites being associated with a second specific set of IP addresses of gateway servers coupled to the network. The initiator may be a computer system having a varying temporary IP address, wherein the responder may be a gateway server that is identified on the network with a first IP address, wherein the first cryptographic suite may be selected from a first database containing a first plurality of cryptographic suites, each of the first plurality of cryptographic suites being associated with a first specific set of IP addresses of gateway servers coupled to the network, wherein the second cryptographic suite may be selected as a function of the initiator having the varying temporary IP address.

Aspects of the present invention provide a computer system, including circuitry configured to create payloads for negotiation of an IKE SA for establishing a secure communication channel over a network, wherein the payloads include a list of one or more proposed SA cryptographic algorithms supported by the computer system, first key exchange information, and a first nonce; circuitry configured to encrypt the payloads with a selected first cryptographic suite; and circuitry configured to frame an IKE SA initiating message that includes the encrypted payloads. The framed IKE SA initiating message may include a header identifying a version of a protocol of the Internet Key Exchange, wherein the payload including the first key exchange information may include one or more Diffie-Hellman values. The computer system may further include circuitry configured to select the first cryptographic suite as a function of an IP address associated with a destination gateway server to which the framed IKE SA initiating message is to be transmitted over the network by the computer system. The IKE SA initiating message may be an IKE SA initiating request message, wherein the computer system may further include circuitry configured to decrypt a received IKE SA initiating response message with a second cryptographic suite selected as a function of an IP address associated with a destination gateway server that sent the IKE SA initiating response message, wherein payloads of the IKE SA initiating response message include a selection of one of the one or more proposed SA cryptographic algorithms, second key exchange information, and a second nonce. The computer system may be a first gateway server that is identified on the network with a first IP address, wherein the destination gateway server is identified on the network with a second IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected from a second database containing a second plurality of cryptographic suites, each of the second plurality of cryptographic suites being associated with a second specific set of IP addresses of gateway servers coupled to the network. The first cryptographic suite may be configured for the negotiation of the IKE SA with a remote computer system connected to the network, wherein the remote computer system is identified on the network with a varying temporary internet protocol address. The computer system may be a remote computer system connected to the network, wherein the remote computer system is identified on the network with a varying temporary internet protocol address, wherein the destination gateway server is identified on the network with a first IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected as a function of the remote computer system having the varying temporary IP address. The framed IKE SA initiating message may be produced by encrypting and authenticating a plain IKE SA initiating message.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination cart in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Benefits, advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein are illustrative of aspects of the invention and are not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Further, no element described herein is required for the practice of the invention unless expressly described as essential or critical. Headings herein are not intended to limit the invention, embodiments of the invention, or other matter disclosed under the headings.

Herein, the term "or" may be intended to be inclusive, wherein "A or B" includes A or B and also includes both A and B. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

What is claimed is:

1. In a computer system, a method comprising:
   creating payloads for negotiation of an Internet Key Exchange ("IKE") security association ("SA") for establishing a secure communication channel over a network, wherein the payloads comprise a list of one or more proposed SA cryptographic algorithms supported by the computer system, key exchange information, and a nonce;
   encrypting the payloads with a selected first cryptographic suite;
   authenticating the payloads with a first authentication algorithm contained within the selected first cryptographic suite; and
   framing an IKE SA initiating message that comprises the encrypted and authenticated payloads.

2. The method as recited in claim 1, wherein the framed IKE SA initiating message comprises a header identifying a version of a protocol of the Internet Key Exchange, and wherein the payload comprising the key exchange information comprises one or more Diffie-Hellman values.

3. The method as recited in claim 1, wherein the first cryptographic suite is selected as a function of an internet protocol ("IP") address associated with a destination gateway server to which the framed IKE SA initiating message is to be transmitted over the network by the computer system.

4. The method as recited in claim 3, wherein the first cryptographic suite is selected from one of a plurality of records stored in a highly secured IKEv2 parameters ("HSIP") database, wherein each record is configured with cipher and integrity parameters that were specifically preselected to be associated with a computer system having a specific IP address for establishing a secure communication channel over a network with the computer system having the specific IP address, wherein the cipher parameters include a cipher algorithm, a cipher key length, and one or more cipher key values, and wherein the integrity parameters include an authentication algorithm and one or more authentication key values, wherein the cipher and authentication algorithms are symmetric with a corresponding record in a HSIP database stored in the computer system having the specific IP address.

5. The method as recited in claim 1, further comprising decrypting a received IKE SA response message with a second cryptographic suite selected as a function of an IP address associated with a destination gateway server that sent the IKE SA response message.

6. The method as recited in claim 1, wherein the first cryptographic suite is configured for the negotiation of the IKE SA with a remote computer system connected to the network, wherein the remote computer system is identified on the network with a varying temporary interne protocol address.

7. The method as recited in claim 1, wherein the IKE SA initiating message is an IKEv2 SA initiating request message.

8. The method as recited in claim 1, wherein the IKE SA initiating message is an IKEv2 SA initiating response message.

9. The method as recited in claim 1, wherein the encrypting the payloads with the selected first cryptographic suite is performed with a symmetric encryption algorithm.

10. A method for negotiating an Internet Key Exchange Version 2 ("IKEv2") security association ("SA") for establishing a secure communication channel over a network between an initiator and a responder, comprising:
    the initiator encrypting payloads of an IKEv2 SA initiating request message with a selected first cryptographic suite, wherein the payloads of the IKEv2 SA initiating request message comprise a list of one or more proposed SA cryptographic algorithms supported by the initiator, key exchange information, and the initiator's nonce, wherein the initiator encrypting payloads of the IKEv2 SA initiating request message with the selected first cryptographic suite further comprises authenticating the payloads of the IKEv2 SA initiating request message with a first authentication algorithm contained within the selected first cryptographic suite;
    the initiator framing a protected IKEv2 SA initiating request message that comprises the encrypted payloads;
    the initiator transmitting the framed protected IKEv2 SA initiating request message over the network to the responder;
    the responder receiving the framed protected IKEv2 SA initiating request message;
    the responder decrypting the payloads of the received protected IKEv2 SA initiating request message;

the responder processing the payloads from the received and decrypted protected IKEv2 SA initiating request message;

the responder encrypting payloads of an IKEv2 SA initiating response message with a selected second cryptographic suite, wherein the payloads of the IKEv2 SA initiating response message comprise a selection of one of the one or more proposed SA cryptographic algorithms supported by the initiator, key exchange information, and the responder's nonce, wherein the responder encrypting payloads of the IKEv2 SA initiating response message with the selected second cryptographic suite further comprises authenticating the payloads of the IKEv2 SA initiating response message with a second authentication algorithm contained within the selected second cryptographic suite;

the responder framing a protected IKEv2 SA initiating response message that comprises the encrypted payloads;

the responder transmitting the framed protected IKEv2 SA initiating response message over the network to the initiator;

the initiator receiving the framed protected IKEv2 SA initiating response message;

the initiator decrypting the payloads of the received protected IKEv2 SA initiating response message; and the initiator processing the payloads from the received and decrypted protected IKEv2 SA initiating response message.

11. The method as recited in claim 10, wherein the initiator is a first gateway server that is identified on the network with a first IP address, wherein the responder is a second gateway server that is identified on the network with a second IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected from a second database containing a second plurality of cryptographic suites, each of the second plurality of cryptographic suites being associated with a second specific set of IP addresses of gateway servers coupled to the network.

12. The method as recited in claim 10, wherein the initiator is a computer system having a varying temporary IP address, wherein the responder is a gateway server that is identified on the network with a first IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected as a function of the initiator having the varying temporary IP address.

13. A computer system, comprising:

circuitry configured to create payloads for negotiation of an Internet Key Exchange ("IKE") security association ("SA") for establishing a secure communication channel over a network, wherein the payloads comprise a list of one or more proposed SA cryptographic algorithms supported by the computer system, first key exchange information, and a first nonce;

circuitry configured to encrypt the payloads with a selected first cryptographic suite; and circuitry configured to frame an IKE SA initiating message that comprises the encrypted payloads, wherein the framed IKE SA initiating message is produced by encrypting and authenticating a plain IKE SA initiating message.

14. The computer system as recited in claim 13, wherein the framed IKE SA initiating message comprises a header identifying a version of a protocol of the Internet Key Exchange, and wherein the payload comprising the first key exchange information comprises one or more Diffie-Hellman values.

15. The computer system as recited in claim 13, further comprising circuitry configured to select the first cryptographic suite as a function of an internet protocol ("IP") address associated with a destination gateway server to which the framed IKE SA initiating message is to be transmitted over the network by the computer system.

16. The computer system as recited in claim 13, wherein the IKE SA initiating message is an IKE SA initiating request message, the computer system further comprising circuitry configured to decrypt a received IKE SA initiating response message with a second cryptographic suite selected as a function of an IP address associated with a destination gateway server that sent the IKE SA initiating response message, wherein payloads of the IKE SA initiating response message comprise a selection of one of the one or more proposed SA cryptographic algorithms, second key exchange information, and a second nonce.

17. The computer system as recited in claim 16, wherein the computer system is a first gateway server that is identified on the network with a first IP address, wherein the destination gateway server is identified on the network with a second IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected from a second database containing a second plurality of cryptographic suites, each of the second plurality of cryptographic suites being associated with a second specific set of IP addresses of gateway servers coupled to the network.

18. The computer system as recited in claim 16, wherein the first cryptographic suite is configured for the negotiation of the IKE SA with a remote computer system connected to the network, wherein the remote computer system is identified on the network with a varying temporary internet protocol address.

19. The computer system as recited in claim 16, wherein the computer system is a remote computer system connected to the network, wherein the remote computer system is identified on the network with a varying temporary internet protocol address, wherein the destination gateway server is identified on the network with a first IP address, wherein the first cryptographic suite is selected from a first database containing a first plurality of cryptographic suites, each of the first plurality of cryptographic suites being associated with a first specific set of IP addresses of gateway servers coupled to the network, wherein the second cryptographic suite is selected as a function of the remote computer system having the varying temporary IP address.

20. The computer system as recited in claim 13, wherein the authenticating of the plain IKE SA initiating message is performed with the selected first cryptographic suite.

* * * * *